United States Patent
Mossoba et al.

(10) Patent No.: US 11,562,365 B2
(45) Date of Patent: Jan. 24, 2023

(54) USER AUTHENTICATION BASED ON A USER INTERACTION ASSOCIATED WITH A TRANSACTION

(71) Applicant: Capital One Services, LLC, McLean, VA (US)

(72) Inventors: Michael Mossoba, Arlington, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/777,174

(22) Filed: Jan. 30, 2020

(65) Prior Publication Data

US 2021/0241276 A1   Aug. 5, 2021

(51) Int. Cl.
*G06Q 20/40* (2012.01)
*H04L 9/40* (2022.01)

(52) U.S. Cl.
CPC ......... *G06Q 20/4016* (2013.01); *H04L 63/08* (2013.01)

(58) Field of Classification Search
CPC .... G06Q 20/4016; G06Q 20/40; H04L 63/08; H04L 9/40
See application file for complete search history.

(56) References Cited

U.S. PATENT DOCUMENTS

| | | | |
|---|---|---|---|
| 7,110,959 B2 | 9/2006 | Hahn-Carlson | |
| 8,041,030 B2 | 10/2011 | Somers et al. | |
| 9,418,501 B2 * | 8/2016 | Loomis | G06F 16/9566 |
| 2005/0091152 A1 * | 4/2005 | Suisa | G06Q 20/4016 705/39 |
| 2006/0161780 A1 * | 7/2006 | Berryman | G06F 21/64 713/176 |
| 2012/0192255 A1 * | 7/2012 | Ganesan | H04L 63/18 726/6 |
| 2012/0215553 A1 * | 8/2012 | Leston | G06Q 10/10 705/2 |
| 2016/0247219 A1 * | 8/2016 | Sorensen | G06F 16/9535 |
| 2018/0005227 A1 * | 1/2018 | Sandelov | G06K 7/087 |

* cited by examiner

*Primary Examiner* — Kenneth Bartley
*Assistant Examiner* — Bhavin D Shah
(74) *Attorney, Agent, or Firm* — Harrity & Harrity, LLP

(57) ABSTRACT

An example fraud analysis platform may receive timing information associated with a user interaction during a transaction, wherein the user interaction is associated with a user engaging in a transaction using a transaction account and a transaction device to access the transaction account. The fraud analysis platform may generate, based on the timing information, a transaction interaction signature associated with the user interaction. The fraud analysis platform may compare the transaction interaction signature to a reference signature associated with an authorized user of a transaction account. The fraud analysis platform may determine, based on the transaction interaction signature being associated with the reference signature, that the user interaction was performed by the authorized user of the transaction account. The fraud analysis platform may perform, based on determining that the user interaction was performed by the authorized user, an action associated with the transaction or transaction account.

20 Claims, 10 Drawing Sheets

USER AUTHENTICATION BASED ON A USER INTERACTION ASSOCIATED WITH A TRANSACTION

BACKGROUND

Fraud impacts numerous businesses and consumers, affecting millions of dollars in transactions. With the advancement of technology, many sophisticated methods are being used to commit fraud, while fraud detection and/or fraud analysis has been employed to combat fraud. In some cases, to prevent fraudulent transactions from occurring, a user may be authenticated (e.g., verified as an authorized user) when engaging in a transaction (e.g., by entering security information, such as a personal identification number for a transaction account, providing a signature to authenticate the transaction, and/or the like).

SUMMARY

According to some implementations, a method may include receiving timing information associated with a user interaction during a transaction, wherein the user interaction is associated with a user engaging in a transaction using a transaction account and a transaction device to access the transaction account; receiving transaction device information associated with the transaction device; generating, based on the timing information, a transaction interaction signature associated with the user interaction; identifying, based on the transaction device information, a set of reference signatures in a reference signature data structure, wherein the reference signature data structure includes a plurality of reference signatures associated with user interactions involving the transaction account, wherein the set of reference signatures are reference signatures, of the plurality of reference signatures, that are mapped to the transaction device information; determining that the transaction interaction signature is associated with a reference signature of the set of reference signatures, wherein the reference signature is associated with an authorized user of the transaction account; determining, based on the transaction interaction signature being associated with the reference signature, that the user interaction was performed by the authorized user of the transaction account; and performing, based on determining that the user interaction was performed by the authorized user, an action associated with the transaction or transaction account.

According to some implementations, a device may include one or more memories and one or more processors, communicatively coupled to the one or more memories, configured to: generate a reference signature based on a first user interaction performed by an authorized user of a transaction account, wherein the first user interaction is performed by the authorized user during a first transaction, and wherein the reference signature is generated based on first timing information associated with the first user interaction; receive, from a transaction device, second timing information associated with a second user interaction during a second transaction, wherein the second user interaction is associated with a user engaging in the second transaction using the transaction account and the transaction device; generate, based on the second timing information, a transaction interaction signature associated with the second user interaction; determine, based on a portion of the transaction interaction signature matching a threshold portion of the reference signature, that the second user interaction was performed by the authorized user; and perform, based on determining that the second user interaction was performed by the authorized user, an action associated with the transaction or the transaction account.

According to some implementations, a non-transitory computer-readable medium may store one or more instructions. The one or more instructions, when executed by one or more processors of a device, may cause the one or more processors to: receive timing information associated with a user interaction during a transaction, wherein the user interaction is associated with a user engaging in a transaction using a transaction account and a transaction device to access the transaction account, and wherein the timing information includes information identifying at least one of: timing associated with the user utilizing, via the transaction device, a transaction card of the transaction account, timing associated with the user entering, via the transaction device, user authentication information associated with the transaction account, or timing associated with providing a hand signature via the transaction device; generate, based on the timing information, a transaction interaction signature associated with the user interaction; compare the transaction interaction signature to a reference signature associated with an authorized user of a transaction account; determine, based on the transaction interaction signature being associated with the reference signature, that the user interaction was performed by the authorized user of the transaction account; and perform, based on determining that the user interaction was performed by the authorized user, an action associated with the transaction or transaction account.

DETAILED DESCRIPTION

Figure 1A:
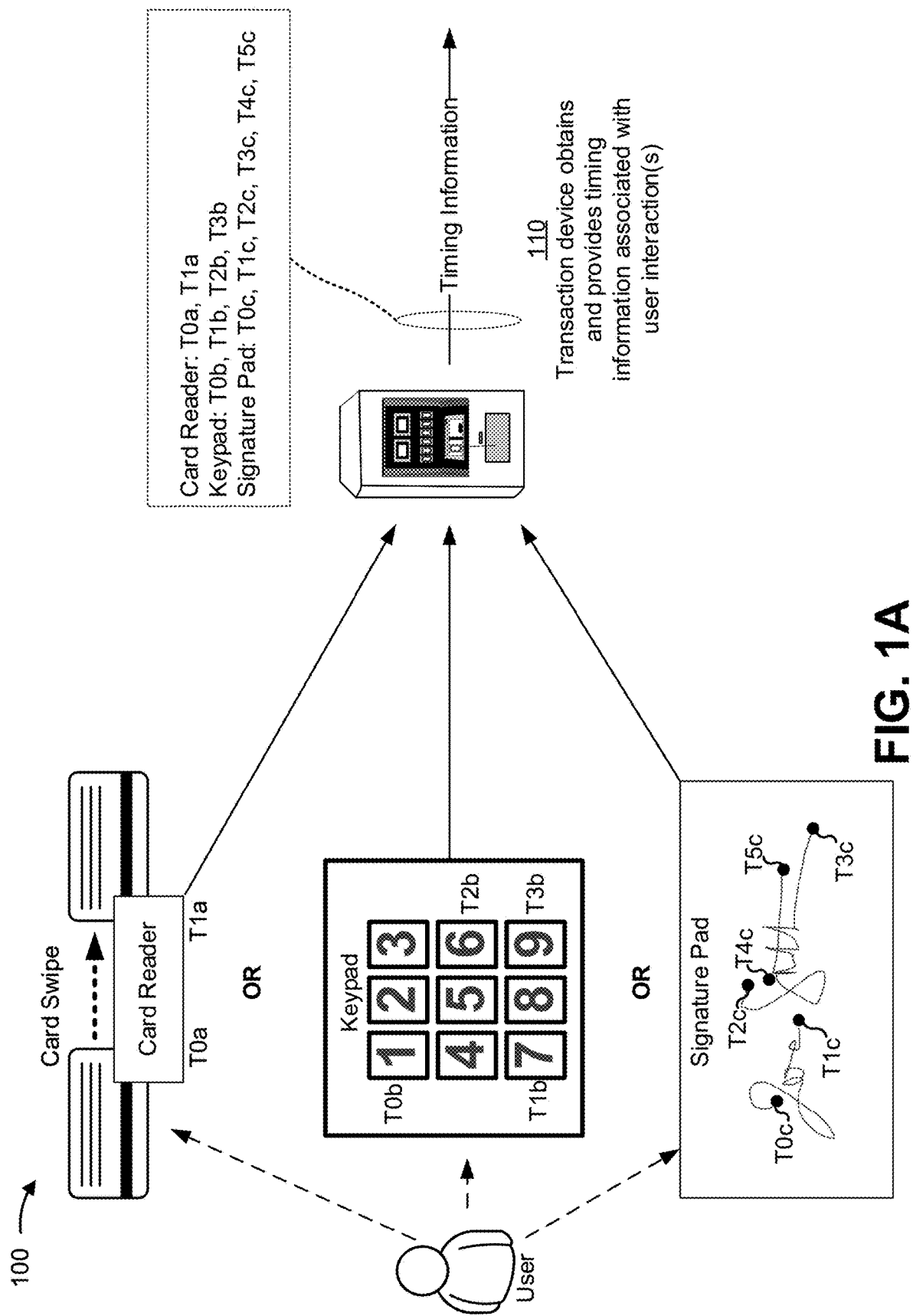
FIGS. 1A-1E are diagrams of an example implementation described herein.

The following detailed description of example implementations refers to the accompanying drawings. The same reference numbers in different drawings may identify the same or similar elements.

In some instances, a fraud analysis may be performed on a transaction associated with a financial institution (e.g., a bank, a credit union, and/or the like). For example, a financial institution may initiate a fraud analysis on a transaction associated with a transaction account (e.g., a checking account, a savings account, a credit account, and/or the like) of the financial institution. The fraud analysis may be performed during the transaction and/or after the transaction is completed (e.g., after a transaction backend of the financial institution approved the transaction). In some cases, an initial fraud analysis may not have been performed while the transaction was pending (e.g., after the transaction was initiated by a customer but before the transaction was approved by the financial institution). In other cases, the transaction may have passed the initial fraud analysis (e.g., because the transaction did not appear fraudulent according to the initial fraud analysis). However, if the transaction was fraudulent, the customer and/or the financial institution may be liable for any lost funds associated with the fraudulent transaction.

In some cases, it may take days or weeks to identify that a transaction was fraudulent. However, in order to increase the chances of recovering lost funds from a fraudulent transaction, a financial institution and/or user may attempt to identify that the transaction was fraudulent as quickly as possible. In some previous fraud analysis techniques, a financial institution may rely on a pattern analysis of recent transactions and compare this pattern to historical transactions in order to identify potentially fraudulent transactions. This method of fraud analysis necessitates a delay in detecting a fraudulent transaction. First, the financial institution must wait to collect enough recent transactions to perform a pattern analysis. This may take hours, days, or weeks depending on the frequency of the transactions to gather enough data for pattern analysis. Second, the computing resources require time to perform the pattern analysis, access historical transaction data, and compare the processed recent transactions with the historical data. As more transactions are analyzed, corresponding fraud analyses for any particular transaction may be queued and delayed. This delay in the queue is proportional to how much data a computer needs to process for each transaction. Furthermore, some fraud analyses may involve complex computing systems and/or complex user interactive systems that receive user feedback (e.g., using a voice response system, natural language processing, and/or the like) to detect fraudulent activity (e.g., based on the user detecting the fraudulent transaction in a financial statement). Accordingly, previous fraud analysis techniques of completed transactions may take extended periods of time to be completed and/or performed and/or further involve relatively large amounts of data, computing resources, and/or communication resources.

In some cases, a merchant may use a transaction device to permit a user to engage in a transaction using the transaction account. For example, the user may interact with a card reader device of the transaction device, enter security information (e.g., a personal identification number (PIN) or other code associated with the transaction account), provide a hand signature (e.g., via an electronic signature pad associated with the transaction device), and/or the like. The user may engage in such interactions with the transaction device to provide the required information needed to process the transaction using the transaction account. However, in some cases, such interactions, themselves, may not prevent the transaction from being fraudulent. For example, a fraudulent user may obtain access to an authorized user's transaction card and use the transaction card to engage in a fraudulent transaction. Furthermore, a fraudulent user may fraudulently obtain access to a user's security information (e.g., PIN) and use the security information to engage in a fraudulent transaction. Moreover, a fraudulent user may forge and/or recreate an authorized user's signature via an electronic keypad of the transaction device to appear to authenticate the transaction.

Some implementations described herein provide a fraud analysis platform to perform a user authentication for a transaction and/or a fraud analysis for a transaction based on characteristics of one or more interactions with a transaction device as described herein. For example, based on the one or more interactions, the fraud analysis platform may generate a transaction interaction signature for the transaction, compare the transaction interaction signature to a reference signature corresponding to an authorized user performing the one or more interactions, and determine whether the one or more interactions was performed by an authorized user, and thereby whether the transaction is authorized or fraudulent. The transaction interaction signature may be representative of timing information (e.g., timestamps) associated with individual actions performed during the transaction being analyzed, and/or the reference signature may be representative of timing information associated with individual actions performed during previous transactions.

In this way, because timing information (and/or the signatures) associated with one or more interactions with a transaction device can be analyzed in a relatively short time period, the fraud analysis platform may more quickly determine a likelihood that the transaction was fraudulent and/or detect that the transaction was fraudulent, lessening the amount of data needed to process a fraud analysis for a transaction while improving accuracy with respect to detecting that the transaction was fraudulent. Accordingly, relative to previous techniques, the fraud analysis platform as described herein may increase the likelihood of a financial institution and/or a user recovering any lost funds from the fraudulent transaction. Furthermore, relative to previous techniques, the fraud analysis platform may conserve computing resources and/or network resources used to determine the likelihood that the transaction was fraudulent and/or detect that the transaction was fraudulent.

As used herein, a "merchant" may refer to any individual or organization involved in the sale or leasing of goods or services. For example, a merchant may be a trader, a retailer, a vendor, a seller, a lessor, and/or the like.

FIGS. 1A-1E are diagrams of an example implementation 100 described herein. Example implementation 100 includes a transaction device and a fraud analysis platform with a timing information processor, a signature generator, a signature analysis model, and a reference data structure. In example implementation 100, a user may be authenticated and/or a transaction involving a transaction account may be determined to be authorized (or not fraudulent) based on an analysis of the user's interaction (referred to herein as a "user interaction") with a transaction device during a transaction involving the transaction account. The transaction may be between the user and a merchant that owns, operates, and/or utilizes the transaction device to engage in the transaction with the user. In some implementations, the transaction may be determined to be authorized in real-time (e.g., between a user providing a transaction card for the transaction and the transaction being authorized by a transaction backend) and/or likely authorized or non-fraudulent during a post-transaction fraud analysis.

As shown in FIG. 1A, and by reference number 110, the transaction device obtains and/or provides timing information associated with one or more user interactions. As shown, a user interaction may involve the user swiping a transaction card through a card reader, the user entering a PIN via a keypad, and/or the user providing a hand signature via an electronic signature pad. The transaction device may be configured to monitor and/or track timing information associated with the user interaction. For example, the transaction device may timestamp different phases and/or individual actions by the user during the user interaction and record corresponding timestamps (e.g., in a data structure of the transaction device) of the individual actions to generate and/or provide the timing information. Accordingly, as described herein, the timing information may include one or more timestamps associated with individual actions of the user interactions.

In example implementation 100, a user interaction may involve the user swiping a transaction card through a card reader. For example, to engage in a transaction using a transaction account (e.g., a credit account, a debit account, and/or the like), the user may swipe a transaction card associated with the transaction account, which permits the transaction device (via the card reader and a magnetic strip) to receive account information (e.g., an account number and/or account identifier) associated with the transaction account. In such cases, the transaction device may be configured to generate timing information associated with timing of the card swipe. For example, the transaction device may generate a timestamp associated with a beginning of the card swipe (shown as, and referred to herein as, "T0a"), an end of the card swipe (shown as, and referred to herein as, "T1a"), and/or an intermediate moment of the card swipe (e.g., corresponding to timing of reading an intermediate bit from a magnetic strip of the transaction card). More specifically, a timestamp associated with a beginning of the card swipe may represent the moment at which the card reader reads a first bit of a magnetic strip (and/or a bit from a chip) of the transaction card, the moment at which the card reader detects the card swipe being initiated or started, and/or the like. Further, a timestamp associated with an end of the card swipe may represent the moment at which the card reader reads a last bit of a magnetic strip of the transaction card, the moment at which the card reader no longer detects the card swipe, and/or the like. In some implementations, a timestamp for an intermediate moment of the card swipe may correspond to a moment at which the card reader reads an intermediate bit of the magnetic strip of the transaction card. Accordingly, the timing information from the transaction device may include timestamps corresponding to a duration of a card swipe of the transaction card, which can be used to determine a probability that the transaction card was swiped by an authorized user or an unknown (or potentially fraudulent) user.

As another example, a user interaction may involve the user entering security information (e.g., a PIN) via a key pad (or other type of input component of the transaction device). For example, to engage in a transaction (e.g., a debit transaction) using a transaction account (e.g., a debit account), the user may be required to enter a PIN associated with the transaction account to permit the transaction to be authorized. In such cases, the transaction device may be configured to generate timing information associated with timing of each keystroke and/or interaction with an input element (e.g., a button, a key, and/or the like) associated with providing the PIN. In example implementation 100, the security information may be a PIN of "1769" for an authorized user. Accordingly, as shown, the transaction device may generate a timestamp for the moment the user enters the "1" (shown as, and referred to herein as, "T0b"), for the moment the user enters the "7" (shown as, and referred to herein as, "T1b"), for the moment the user enters the "6" (shown as and referred to herein as, "T2b"), for the moment the user enters the "9" (shown as, and referred to herein as, "T3b"). In some implementations, the transaction device may generate and/or include a timestamp for the moment the user submits the security information (e.g., the moment the user presses an "Enter" key of the keypad). Accordingly, the timing information from the transaction device may include timestamps corresponding to a duration of a user providing security information, one or more durations between entries of elements of the security information, and/or the like.

In yet another example, a user interaction may involve the user providing a hand signature via an electronic signature pad associated with the transaction device. For example, to engage in a transaction (e.g., a credit transaction) using a transaction account (e.g., a credit account), the user may be required (e.g., by a merchant engaging in the transaction, such as the merchant associated with the transaction device) to provide a hand signature to authenticate the user (e.g., using an analysis of the hand signature of the user and a reference hand signature of the user, such as a hand signature that the user provided when signing up for and/or being registered with the transaction account). In such cases, the transaction device may be configured to generate timing information associated with timing of each portion of the hand signature (e.g., corresponding to each time the user applies a stylus (or finger) to the electronic signature pad and/or removes the stylus from the electronic signature pad). In example implementation 100, assume that an authorized user's name is Joe Smith and the user's hand signature is representative of the user's name. Accordingly, as shown, the transaction device may generate a timestamp for the moment the user starts to sign "Joe" (shown as, and referred to herein as, "T0c"), for the moment the user stops signing "Joe" (shown as, and referred to herein as, "T1c"), for the moment the user starts signing "Smith" (shown as, and referred to herein as, "T2c"), for the moment the user stops signing "Smith" (shown as, and referred to herein as, "T3c"), for the moment the user starts to cross the 't' in "Smith" (shown as, and referred to herein as, "T4c"), and for the moment the user stops crossing the 't' in "Smith" (shown as, and referred to herein as, "T5c"). In some implementations, the transaction device may generate and/or include a timestamp for the moment the user submits the hand signature for the transaction (e.g., the moment the user presses an "Enter" key of the electronic signature pad). Accordingly, the timing information from the transaction device may include timestamps corresponding to a duration of a user providing a hand signature, one or more durations of the user providing portions of the hand signature (e.g., corresponding to durations of the user applying a stylus to an electronic signature pad), one or more durations of the user not providing a portion of the signature (e.g., corresponding to durations between the user applying a stylus to an electronic signature pad), and/or the like.

In this way, the transaction device may obtain, generate, and/or provide timing information associated with a user interaction for a transaction to permit the fraud analysis platform to determine whether a user associated with the user interaction is an authorized user and/or to determine whether the transaction is likely a fraudulent transaction (e.g., a transaction that is being performed by an unauthorized user).

Figure 1B:
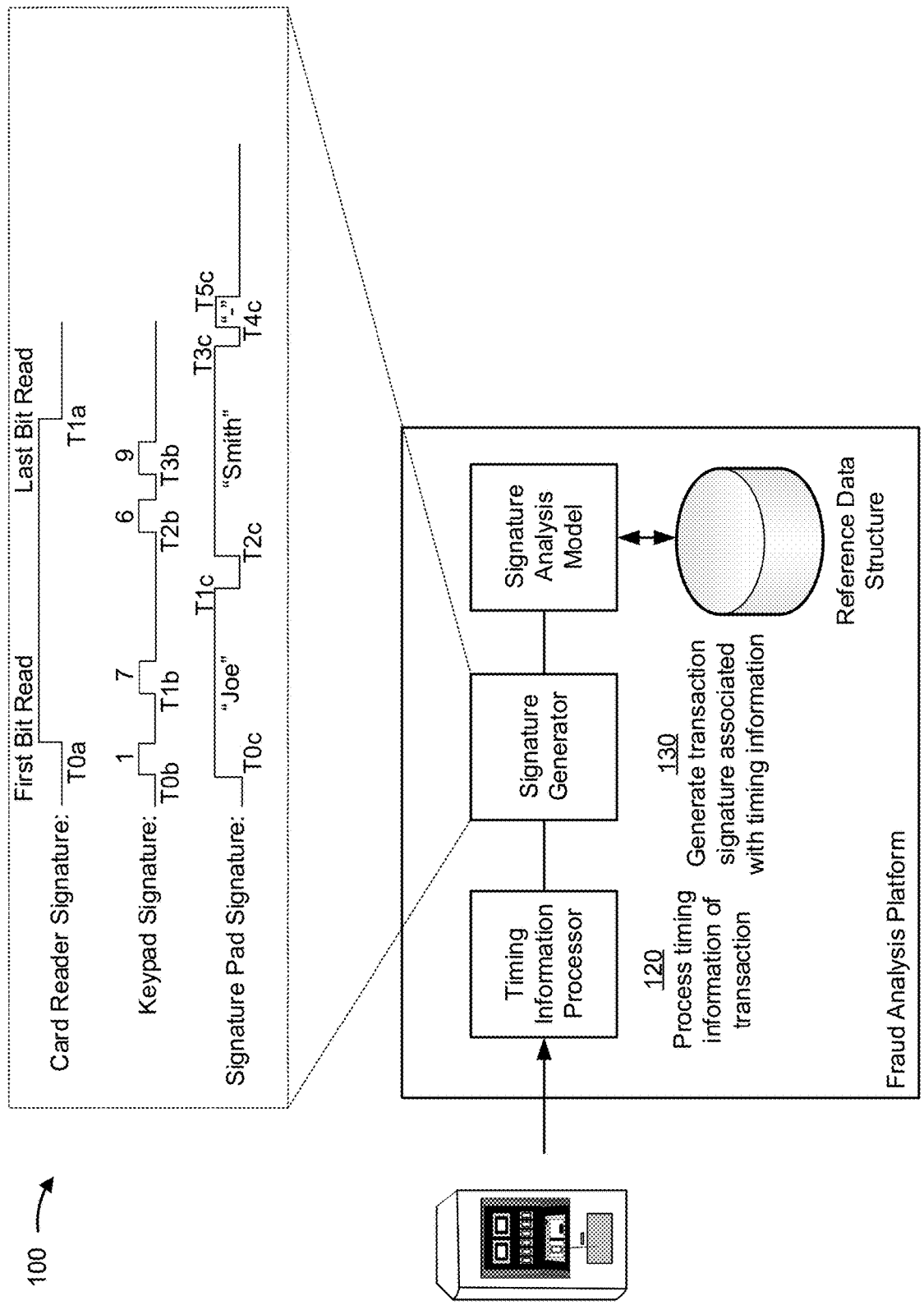

As shown in FIG. 1B, and by reference number 120, the fraud analysis platform, via the timing information processor, processes the timing information associated with the transaction. For example, the fraud analysis platform may process the timing information, received from the transaction device, to identify timestamps associated with individual actions of the user interaction. The fraud analysis platform may receive the timing information in real-time (e.g., as the transaction between the user and the merchant is occurring and/or pending) and/or after the transaction (e.g., during a post-transaction fraud analysis of the transaction).

In some implementations, the timing information may be included with transaction information associated with the transaction. For example, the transaction information may indicate the type of the transaction (e.g., a credit transaction, a debit transaction, and/or the like), an identifier of the transaction card and/or transaction account (e.g., to permit the fraud analysis platform to identify authorized user information for the transaction account), and/or the like. In some implementations, the transaction information may include information identifying the type of user interaction that is associated with the timing information (e.g., whether the user interaction involves the user swiping a transaction card, entering security information, providing a hand signature, and/or the like). Additionally, or alternatively, the transaction information may include transaction device information associated with the transaction device used to process the transaction. For example, the transaction device information may include an identifier of the transaction device, a make/model of the transaction device, a location of the transaction device (and/or the transaction), the merchant associated with the transaction device, and/or the like. Accordingly, the fraud analysis platform may process the timing information in association with the transaction information to determine a timing associated with the user interaction and whether the timing is representative of an authorized user of the transaction account performing the user interaction via the transaction device.

In this way, the fraud analysis platform may process the timing information to map the timestamps to corresponding actions of the user interaction in order to permit the fraud analysis platform to generate a transaction interaction signature associated with the signature.

As further shown in FIG. 1B, and by reference number 130, the fraud analysis platform, via the signature generator, generates a transaction interaction signature associated with the timing information. The transaction interaction signature may be a data representation of the user interaction. More specifically, the transaction interaction signature may be a data representation of timing of the user interaction.

According to some implementations, the transaction interaction signature is generated based on translating, according to a signature model, timing information (and/or timestamps of the timing information) to data points (or data values). For example, the fraud analysis platform may translate timestamps of the timing information to data points, to generate the transaction interaction signature, and the data points may be combined to form the transaction interaction signature. Additionally, or alternatively, a length (e.g., a quantity of data points) of the transaction interaction signature may correspond to a duration of the user interaction. For example, if the user interaction is approximately 500 milliseconds (ms) long, and the transaction interaction signature is to include a data point for every millisecond of the user interaction, the transaction interaction signature (or a particular portion of the transaction interaction signature) may include 500 data points.

In some implementations, values for data points of the transaction interaction signature may be determined based on a type of action associated with the timestamps. For example, the timing information can indicate the type of action associated with the timestamp. More specifically, the timing information may indicate whether a timestamp is associated with a beginning or end of a card swipe, whether a timestamp is associated with an entry of an input associated with security information, whether a timestamp is associated with an application or release of a stylus for a hand signature, and/or the like. In this way, the fraud analysis platform may determine values for the data points of the transaction interaction signature based on the type of action being represented by the data points. As shown in example implementation 100, values for the data points may be binary (e.g., a '0' or '1'), though other example values and/or types of signatures may be used to represent the user interaction during the transaction.

In example implementation 100, the transaction interaction signature may include a card reader signature (e.g., when the timing information indicates that the user interaction is a card swipe) that indicates a duration of time associated with a card swipe through the card reader of the transaction device. The duration of time may be represented in the transaction interaction signature as a duration of a pulse (e.g., when values of the data points increase, such as going from '0' to '1'). Additionally, or alternatively, the transaction interaction signature for a card reader signature may include and/or indicate a duration of time corresponding to the difference between T0$a$ and T1$a$ (e.g., as a numerical data value corresponding to an amount of time that passed between the card swipe beginning and the card swipe ending). In this way, the transaction interaction signature may include a card reader signature when the user interaction involves the user swiping the transaction card.

Additionally, or alternatively, the transaction interaction signature may include a keypad signature (e.g., when the timing information indicates that the user interaction involves a security information entry) that indicates timing associated with entering security information (or other information) via a keypad of the transaction device. The timing may be represented in the transaction interaction signature as a quantity of pulses separated by durations that correspond to the differences in timestamps for when the user pressed input elements of the keypad to enter the security information. Additionally, or alternatively, the transaction interaction signature for a keypad signature may include and/or indicate durations of time between the user input elements being pressed (e.g., as numerical data values corresponding to an amount of time that passed between the card swipe beginning and the card swipe ending). For example, the transaction interaction signature may include a first duration corresponding to the difference between T1$b$ and T1$b$, a second duration corresponding to the difference between T1$b$ and T2$b$, and a third duration corresponding to the difference between T2$b$ and T3$b$. In this way, the transaction interaction signature may include a keypad signature when the user interaction involves the user entering security information via the keypad.

In some implementations, the transaction interaction signature may include a signature pad signature (e.g., when the timing information indicates that the user interaction involves a hand signature entry) that indicates timing associated with providing a hand signature via an electronic signature pad of the transaction device. The timing may be represented in the transaction interaction signature as a quantity of durations that correspond to the differences in timestamps for when the user is applying (or pressing) a stylus to the electronic signature pad to provide a hand signature. For example, the transaction interaction signature may include a first duration corresponding to the difference between T0$c$ and T1$c$ (corresponding to the amount of time for the user to sign "Joe"), a second duration corresponding to the difference between T2$c$ and T3$c$ (corresponding to the amount of time for the user to sign "Smith"), and a third duration corresponding to the difference between T4$c$ and T5$c$ (corresponding to the amount of time for the user to cross the 't' in "Smith"). Additionally, or alternatively, the transaction interaction signature for a signature pad signature may include and/or indicate durations of time between the user applying the stylus to the electronic signature pad (e.g., as numerical data values corresponding to an amount of time that passed between the user removing the stylus and the user performing a next action to reapply the stylus or submit the hand signature). For example, the transaction interaction signature may include a fourth duration corresponding to the difference between T1$c$ and T2$c$, a fifth duration corresponding to the difference between T3$c$ and T4$c$, and a sixth duration corresponding to the difference between T5$c$ and the user submitting the hand signature. In this way, the transaction interaction signature may include a signature pad signature when the user interaction involves the user providing a hand signature via an electronic signature pad.

In some implementations, the transaction interaction signature may include a plurality of signatures corresponding to a plurality of user interactions. For example, the transaction interaction signature may include two or more of a card reader signature, a keypad signature, and/or a signature pad signature when the transaction involves the user correspondingly swiping a transaction card, entering signature information, and/or providing a hand signature. Accordingly, if the user engages in multiple user interactions, described herein, during a transaction, a transaction interaction signature may be generated to include and/or represent the multiple interactions.

In this way, the fraud analysis platform may generate a transaction interaction signature corresponding to one or more characteristics of the user interaction to permit the fraud analysis platform to determine whether the user is associated with a reference signature associated with an authorized user in the reference data structure.

Figure 1C:
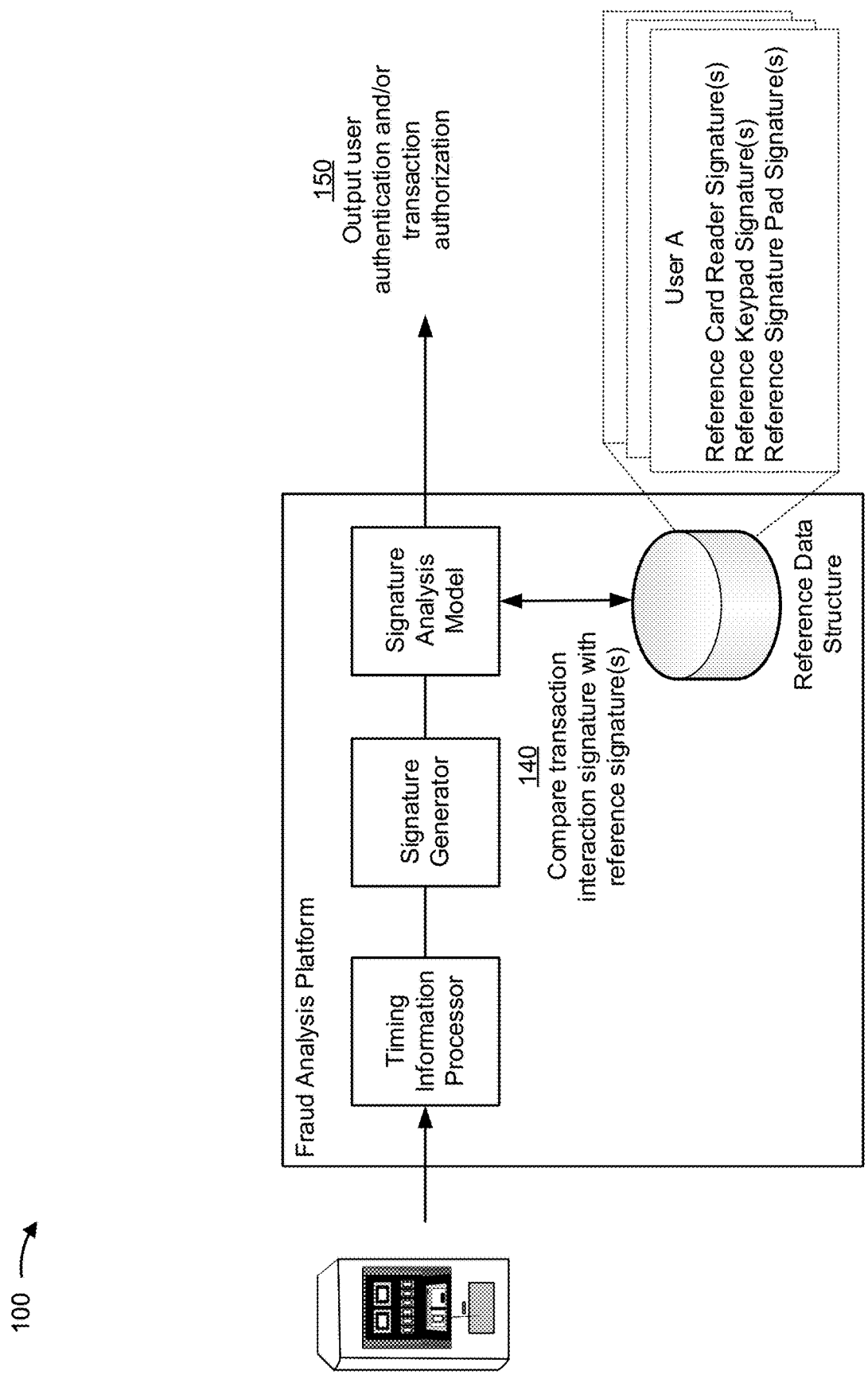

As shown in FIG. 1C, and by reference number 140, the fraud analysis platform, via the signature analysis model, compares the transaction interaction signature with reference signatures in a reference data structure. For example, the fraud analysis platform may cross-reference the transaction interaction signature with reference signatures in the reference data structure to determine whether the transaction interaction signature corresponds to and/or is associated with one or more reference signatures associated with an authorized user of the transaction account. The reference signatures of the reference data structure may be generated in accordance with a same signature model as is used to generate the transaction interaction signature. The reference data structure may be any suitable data structure, such as a table, an index, a list, a graph, and/or the like.

The reference data structure may include a plurality of reference signatures. Each of the reference signatures may be representative of one or more user interactions (e.g., or types of user interactions) associated with one or more authorized users (shown as "User A") associated with the transaction account. For example, the plurality of reference signatures may be representative of an authorized user of the transaction account swiping a transaction card, entering security information, providing a hand signature, and/or the like. Accordingly, some of the reference signatures may be representative of user interactions that are indicative of or known to be associated with non-fraudulent transactions because the user interactions corresponding to the reference signatures were performed by authorized users.

In some implementations, each of the reference signatures may be associated with one or more historical user interactions performed by authorized users of the transaction account during previous transactions and/or during a reference signature calibration process. For example, a reference signature may be generated by processing (e.g., combining, averaging, summing, and/or the like) reference signatures from a plurality of user interactions known to be associated with a same authorized user. Furthermore, each of the reference signatures may be mapped to a corresponding authorized user that is represented by the reference signature. In this way, as described herein, if the transaction interaction signature matches one or more of the reference signatures (e.g., according to a threshold match and/or matching analysis), the fraud analysis platform may determine that the user is (or is likely) an authorized user and/or that the transaction is not (or likely is not) fraudulent.

The reference data structure may include reference signatures for a plurality of transaction accounts. Accordingly, in some implementations, the fraud analysis platform may identify particular reference signatures associated with a transaction account based on receiving transaction account information (e.g., an account number, a user identification, and/or the like) associated with the transaction account from the transaction device (e.g., during a transaction and/or in a request to authorize the transaction).

In some implementations, the reference data structure includes reference signatures that were generated from and/or associated with user interactions that involved one or more of the same types of transactions, same types of transaction devices, same types of merchants, same authorized user (e.g., as identified in transaction information from the transaction device), and/or the like. For example, the reference data structure may include a plurality of reference signatures that are sorted and/or organized according to transaction characteristics (e.g., the type of transaction device involved, the merchant involved in the transaction, the user involved in the transaction, whether the user was authorized or not authorized, and/or the like) of transactions that were monitored and/or analyzed in association with generating the reference signatures. In such a case, the fraud analysis platform may only analyze or compare the transaction interaction signature to the reference signatures associated with the transaction account, reference signatures associated with a user interaction involved in the transaction, reference signatures associated with particular types of transaction devices, and/or the like. Therefore, because such characteristics may affect the user interaction (and/or timing of the user action) that is analyzed by the fraud analysis platform, the fraud analysis platform may achieve improved accuracy with respect to determining whether the user is an authorized user (and/or that the user interaction was performed by an authorized user). Furthermore, comparing only the reference signatures that are mapped to the same characteristics as the transaction of example implementation 100, the fraud analysis platform may conserve computing resources that may otherwise be used analyzing reference signatures associated with users and/or transactions that correspond to different characteristics than the transaction and/or that may be ineffective in determining whether the user is an authorized user or that the transaction is not fraudulent.

In some implementations, the fraud analysis platform may determine that there are no reference signatures associated with the transaction account (and/or associated with one or more other characteristics of the transaction). In such cases, the fraud analysis platform may utilize one or more characteristics associated with authorized users of the transaction account and/or one or more characteristics associated with the transaction in order to determine and/or identify a reference signature that can be used to determine whether the user interaction was performed by an authorized user of the transaction account. For example, the reference signature may be determined or generated from other reference signatures associated with other users that have the same or similar characteristics as an authorized user (e.g., a same age, a same sex or gender, are located in a same area or location, and/or the like). Additionally, or alternatively, the reference signature may be determined or generated from other reference signatures associated with transactions involving one or more similar types of transaction devices (e.g., that utilize a same type of card reader). In this way, although a reference signature may not be available for an authorized user of the transaction account, the fraud analysis platform may use and/or generate a generic reference signature based on characteristics of the authorized user and/or the transaction to determine a probability of whether the user interaction was performed by the authorized user during the transaction.

In some implementations, the reference data structure is configured to store training data associated with a machine learning model configured to analyze user interactions associated with an authorized user and/or non-fraudulent transactions, and to enable other user interactions involving the authorized users to be detected. In such cases, the fraud analysis platform may use such a machine learning model, such as a fraud analysis model, to determine a probability that the user is an authorized user, to determine a probability that the transaction is fraudulent or not fraudulent. For example, the fraud analysis platform may train the fraud analysis model based on one or more authentication parameters and/or fraud detection parameters associated with timing information associated with user interactions during transactions, such as timing of authorized users swiping transaction cards of the transaction account, timing of authorized users entering security information to use the transaction account, timing of authorized users providing hand signatures for authentication, and/or the like. The fraud analysis platform may train the fraud analysis model using historical data associated with determining whether a user interaction is associated with an authorized user or a non-authorized user (e.g., for the transaction account and/or for other transaction accounts). Such historical data may be based on or include feedback (e.g., based on user inputs) from authorized users, merchants, financial institutions, and/or the like that confirm or deny an accuracy of determining whether the user is an authorized user. Using the historical data and the one or more authentication parameters and/or fraud detection parameters as inputs to the fraud analysis model, the fraud analysis platform may determine whether the user interaction is or is not indicative of being performed by an authorized user, to indicate whether the transaction is or is likely not fraudulent. Accordingly, in some implementations, the fraud analysis platform may store the generated transaction interaction signature in the reference data structure to further train such a fraud analysis model.

In this way, the fraud analysis platform may cross-reference the transaction interaction signature with a reference data structure to determine whether the transaction interaction signature matches one or more of the reference signatures, to permit the fraud analysis platform to determine whether the user is an authorized user associated with the transaction account and/or whether the transaction is not (or likely is not) fraudulent.

As further shown in FIG. 1C, and by reference number 150, the fraud analysis platform outputs user authentication information. For example, the fraud analysis platform may provide information that verifies whether the user of example implementation 100 is or is not an authorized user.

To determine whether the user is an authorized user (e.g., an authorized user mapped to one or more of the reference signatures), the fraud analysis platform determines whether the transaction interaction signature matches (e.g., within a threshold) one or more of the reference signatures. For example, the fraud analysis platform may compare the transaction interaction signature to one or more reference signatures (e.g., one or more reference signatures that are associated with an authorized user performing a same type of transaction, using a same type of transaction device, engaging in a transaction at a same location (e.g., a same merchant location), and/or the like) and determine whether the transaction interaction signatures match any of the one or more reference signatures.

According to some implementations, the fraud analysis platform determines that the transaction interaction signature matches the reference signature when one or more durations, determined from the timestamps of the timing information, are within a threshold (e.g., a threshold percentage, a threshold amount of time, and/or the like) of corresponding durations of the reference signature. For example, if the transaction interaction signature indicates that the user swiped the transaction card within a 10 ms range of a reference duration indicated by the reference signature (e.g., a reference signature corresponding to an authorized user swiping the card), the fraud analysis platform may determine that the transaction interaction signature (e.g., or a card reader signature of the transaction interaction signature) matches the reference signature. Additionally, or alternatively, if the transaction interaction signature indicates that a duration of the user swiping the transaction card is within 10% of a duration of the reference signature, the fraud analysis platform may determine that the transaction interaction signature matches the reference signature.

In a similar manner, the fraud analysis platform may perform an analysis of whether the one or more durations of the user entering security information and/or a hand signature, as described herein, match durations of corresponding reference signatures of an authorized user. For example, the fraud analysis platform may determine that the transaction interaction signature matches the reference signature when a threshold portion (e.g., a threshold percentage (e.g., 70%, 85%, 90%, and/or the like), a threshold number of a set of particular data points, and/or the like) of data points of the transaction interaction signature match corresponding data points of the reference signature. As a specific example, if the signatures are sequences of 1000 data points representative of a ten second user interaction (e.g., each data point having a value corresponding to timing of a user interaction in increments of 0.01 seconds) and the threshold is 70% for a match, if 700 or more of the data points of the transaction interaction signature match corresponding data points (in the sequence) of the reference signature, the fraud analysis platform may determine that the transaction interaction signature matches the reference signature. On the other hand, if less than 700 of the data points of the transaction interaction signature match corresponding data points (in the sequence) of the reference signature, the fraud analysis platform may determine that the user interaction does not match the user interaction represented by the reference signature, and therefore, the user is likely not the authorized user associated with the reference signature.

In some examples, if a particular portion of the transaction interaction signature is a match (or a threshold match) of a corresponding portion of a reference signature, the fraud analysis platform may determine that the user is likely the authorized user, despite other portions of the transaction interaction signature not matching the reference signature. For example, if a signature pad hand signature of a transaction interaction signature matches a signature pad signature of the reference signature, the fraud analysis platform may determine that the user interaction was performed by an authorized user represented by the reference signature, regardless of whether a card reader signature of the transaction interaction signature matches a card reader signature of the reference signature (e.g., because a signature pad signature may more accurately indicate that a user interaction was performed by an authorized user than a card reader signature because there are more data points to analyze).

According to some implementations, the fraud analysis platform may determine a probability that the user is an authorized user (and/or that the user interaction was performed by the authorized user) based on a measure of similarity between the transaction interaction signature and a reference signature associated with the authorized user. For example, the more accurately that a transaction interaction signature matches a reference signature, the greater the determined probability that the user interaction was performed by the authorized user associated with that reference signature (and vice versa), and, therefore, the greater the probability that the transaction is not fraudulent (or was performed by an authorized user).

Additionally, or alternatively, the greater the quantity of reference signatures in the reference data structure that are associated with a particular authorized user that match the transaction interaction signature, the greater the probability that the user is the authorized user. For example, the reference data structure may include reference signatures that correspond to previous user interactions that are known to have been performed by authorized users during previous transactions. In such an example, each of the reference signatures may be mapped to a corresponding authorized user, and, therefore, if the transaction interaction signature matches more of the reference signatures for a particular authorized user, the fraud analysis platform may determine that the transaction was performed by that authorized user (rather than if the transaction interaction signature matches fewer reference signatures associated with other authorized users). However, if the transaction interaction signature does not match a threshold percentage (e.g., 50%, 75%, 90%, and/or the like) of reference signatures associated with any of the authorized users, the fraud analysis platform may determine that the user interaction was likely not performed by an authorized user and/or that the transaction is likely fraudulent.

In some implementations, the fraud analysis platform may determine respective probabilities of the user interaction being performed by one or more authorized users represented by one or more reference signatures in the reference data structure. For example, in an example where the reference data structure includes a first plurality of reference signatures associated with a first authorized user and a second plurality of reference signatures associated with a second authorized user, the fraud analysis platform may determine, based on how accurately the transaction interaction signature matches each of the reference signatures in the reference signature database (or each of a subgroup of the reference signatures in the reference signature database), the probability that the user is the first authorized user and the probability that the user is the second authorized user. Accordingly, from the timing information from the transaction device and/or corresponding transaction interaction signature associated with the user interaction, the fraud analysis platform may determine probabilities that the user interaction was performed by the first authorized user or the second authorized user, and correspondingly determine, based on the determined probabilities, whether the transaction was fraudulent. For example, if at least one of the probabilities satisfies a threshold probability that the user interaction was performed by the first authorized user or the second authorized user, the fraud analysis platform may determine that the transaction is likely not fraudulent. On the other hand, if neither (or none) of the probabilities satisfies the threshold probability, then the fraud analysis platform may determine that the transaction is likely fraudulent.

In this way, the fraud analysis platform may determine whether the user is an authorized user and/or a probability that the user is an authorized user, to permit the fraud analysis platform to perform an action associated with the transaction.

Figure 1D:
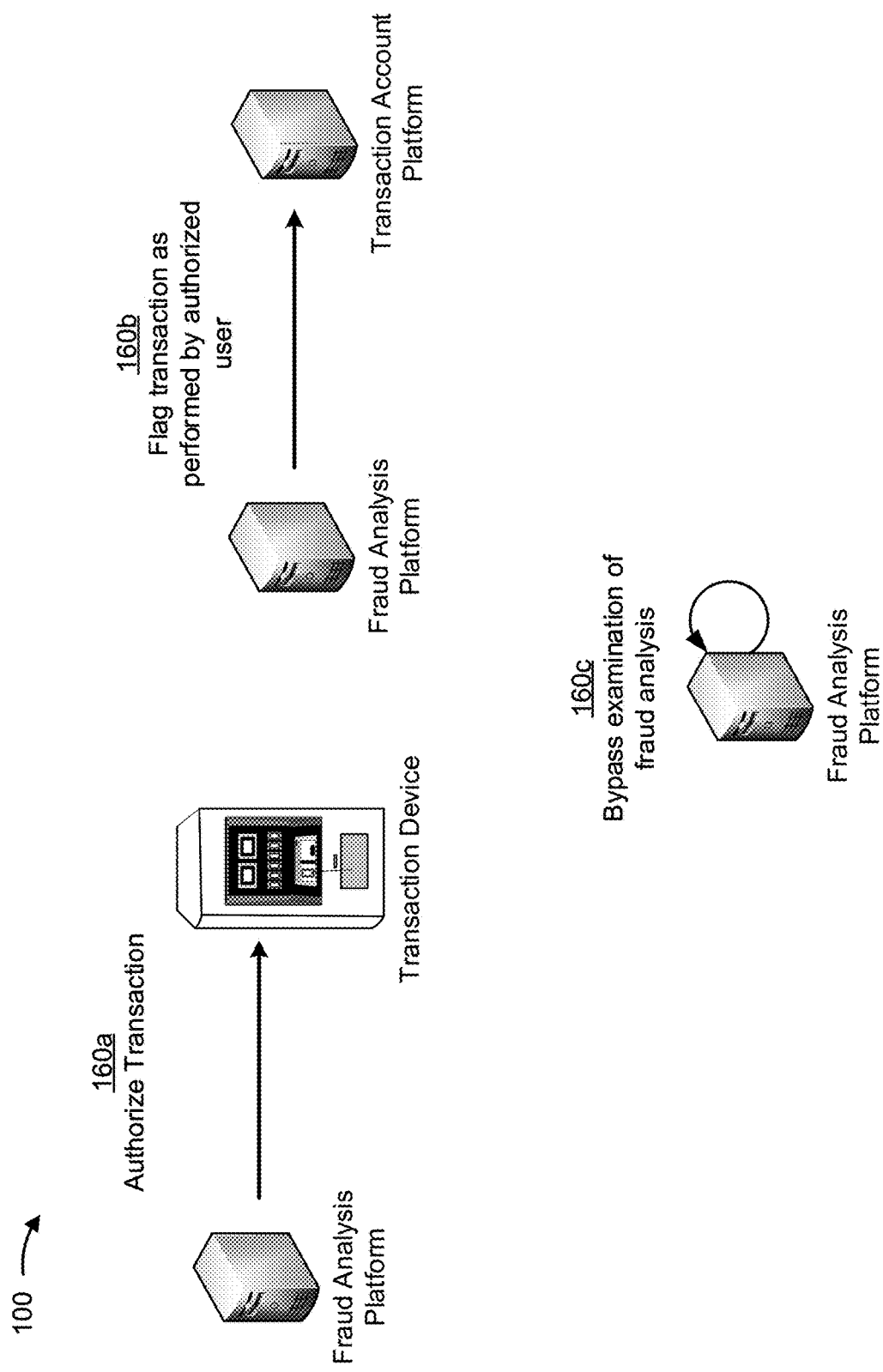

As shown in FIG. 1D, and by reference numbers 160a, 160b, and 160c, the fraud analysis platform may perform one or more actions based on a determined probability that the user is an authorized user. In such cases, as described herein, the fraud analysis platform may determine that the transaction is not fraudulent.

As shown by reference number 160a, the fraud analysis platform may send an authorization to the transaction device to authorize the transaction. For example, the fraud analysis platform may send an authentication token and/or authorization token that can be used by the transaction device to process the transaction. In this way, the fraud analysis platform may authorize a transaction when the fraud analysis platform determines (e.g., in real-time) that the user interaction is likely performed by an authorized user.

As shown by reference number 160b, the fraud analysis platform may flag the transaction as being performed by an authorized user. For example, the fraud analysis platform may append and/or annotate a transaction log of the transaction account to indicate that the transaction likely involved an authorized user. In some implementations, based on the reference signature used to determine that the user interaction was likely performed by an authorized user, the fraud analysis platform may annotate (in the transaction log) the specific authorized user of the transaction account that likely engaged in the transaction. In this way, one or more authorized users associated with the account may verify whether or not the transaction was performed by that authorized user. In some implementations, the authorized users may be able to provide feedback associated with whether the transaction was performed by an authorized user, to permit the fraud analysis platform to train a model (e.g., the fraud analysis model) as described herein.

As shown by reference number 160c, the fraud analysis platform may bypass one or more examinations of a detailed fraud analysis of the transaction. For example, the fraud analysis platform may be configured to perform a plurality of examinations of the transaction, including an analysis of the user interaction. Based on the results of the analysis of the user interaction, the fraud analysis platform may bypass one or more other examinations associated with a detailed fraud analysis of the transaction (e.g., to improve real-time processing of the transaction).

Additionally, or alternatively, the fraud analysis platform may perform a detailed fraud analysis of the transaction account periodically (e.g., every week, every month, and/or the like), after a quantity of transactions, and/or if a fraudulent event and/or fraudulent activity associated with the transaction is detected. However, because the transaction was determined to likely be performed by an authorized user, the fraud analysis platform may bypass one or more examinations of the detailed fraud analysis (e.g., to avoid wasting computing resources and/or network resources associated with performing the examination). Accordingly, the fraud analysis platform may end or forgo a detailed fraud analysis of the transaction, may bypass one or more examinations of the fraud analysis, and/or the like.

Figure 1E:
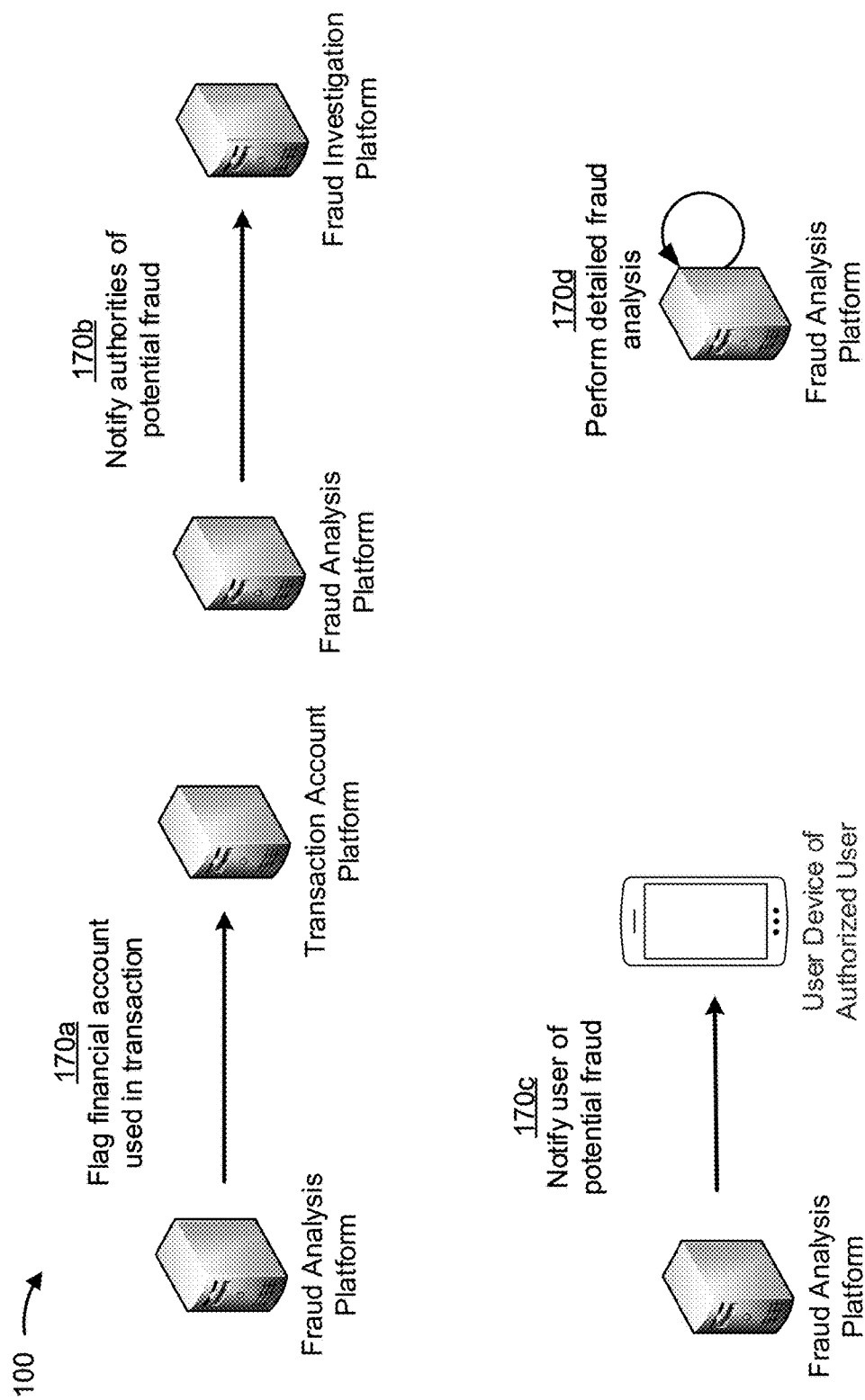

As shown in FIG. 1E, and by reference numbers 170a, 170b, 170c, and 170d, the fraud analysis platform may perform one or more actions based on a determined probability that the user is not an authorized user. In such cases, as described herein, the fraud analysis platform may determine that the transaction is fraudulent.

As shown by reference number 170a, the fraud analysis platform may flag the transaction account used in the transaction. For example, the fraud analysis platform may flag the transaction account to prevent any future transactions involving the transaction account. As shown in FIG. 1E, the fraud analysis platform may flag the transaction account of the user that is maintained by the transaction account platform. Accordingly, the fraud analysis platform may freeze or place a hold on the transaction account to prevent any additional, potentially fraudulent transactions from occurring (e.g., until an investigation is performed to determine whether the transaction account has been compromised).

In some implementations, the fraud analysis platform may flag the merchant involved in the transaction. For example, the merchant may be flagged to prevent any further transactions involving any transaction account of a financial institution associated with the transaction account and the merchant. Additionally, or alternatively, one or more other merchants in a same category of the merchant (e.g., in a same location, in a same industry, and/or the like) may be flagged to prevent any further transactions involving the one or more other merchants.

As shown by reference number 170b, the fraud analysis platform may notify authorities of potential fraud. The authorities may include a fraud investigation entity of the merchant (e.g., via a user device accessible to a representative of the merchant) involved in the transaction (e.g., to permit the merchant to verify an identity of the user), of a financial institution, a law enforcement agency, and/or the like. As shown in FIG. 1E, the fraud analysis platform may notify (e.g., via a notification message that includes information associated with the transaction) a fraud investigation platform of the potential fraudulent transaction. Through such a notification, the fraud analysis platform may cause the fraud investigation platform to open an investigation (e.g., to notify one or more human investigators of the potential fraud) associated with the transaction and/or the transaction account used in the transaction.

As shown by reference number 170c, the fraud analysis platform may notify an authorized user of potential fraud. For example, the fraud analysis platform may initiate a phone call to a user device of an authorized user of the transaction account, send a message (e.g., a text, an email, and/or the like), send an alert to the user device (e.g., via an application associated with the user device and a financial institution of the transaction account), and/or the like. The fraud analysis platform may notify the authorized user via a notification message (e.g., in the phone call, text message or alert) that indicates that the transaction is or was likely fraudulent and/or that the transaction account used in the transaction may have been compromised by an unauthorized user. In some implementations, if the transaction account has been frozen or placed on hold, the notification may indicate the same to the user.

In some implementations, the fraud analysis platform may send a request to the user (e.g., via the user device) to verify that the transaction was authorized. For example, the fraud analysis platform may send a prompt to the authorized user to indicate whether the transaction was authorized or fraudulent (e.g., based on the user's knowledge). The user may enter a response that indicates whether or not the user believes the transaction was authorized, and, thus, the fraud analysis platform may receive an indication of whether the transaction was fraudulent. In some implementations, the fraud analysis platform may train a machine learning model, such as the fraud analysis model, based on the response from the user.

As shown by reference number 170d, the fraud analysis platform may perform a detailed fraud analysis. For example, the fraud analysis platform may perform the detailed fraud analysis based on being unable to match the transaction interaction signature to a reference signature in the reference data structure. During the detailed fraud analysis, the fraud analysis platform may perform any other suitable examination of the transaction to determine whether the transaction is or was fraudulent. For example, the fraud analysis platform may perform an analysis of a number of transactions that occurred within a recent time period (e.g., to detect whether a threshold number of transactions (e.g., five transactions, ten transactions, and/or the like) occurred within the recent time period, indicating a likely fraudulent transaction) using the transaction account of the transaction, a location-based analysis of the transaction and an authorized user, timing associated with the transaction, an analysis of a transaction history associated with the transaction account, an analysis of fraud history associated with the merchant, products, and/or services of the transaction, and/or the like.

In some implementations, the detailed fraud analysis may include contacting the user to request an indication of the user's knowledge with respect to the transaction being fraudulent, as described in connection with reference number 170c. Additionally, or alternatively, the detailed fraud analysis may include contacting one or more other users that have been involved in transactions with the merchant to determine whether the merchant is associated with fraudulent transactions. As described above, if the fraud analysis platform determines that the transaction interaction signature matches a reference signature of the reference data structure, the fraud analysis platform may end or forgo the detailed fraud analysis, may bypass one or more examinations of the fraud analysis, and/or the like.

In some implementations, the fraud analysis platform may train the fraud analysis model based on one or more parameters associated with detecting that the transaction was fraudulent, such as whether the transaction was determined to be fraudulent (e.g., according to the determined probability) based on the transaction interaction signature not being matched to a reference signature in the reference data structure, one or more parameters associated with the transaction, one or more parameters associated with the user interaction associated with the transaction, one or more parameters associated with the user, and/or the like. The fraud analysis platform may train the machine learning model using historical data associated with detecting fraudulent transactions according to the one or more parameters. Using the historical data and the one or more parameters as inputs to the fraud analysis model, the fraud analysis platform may detect whether subsequent transactions (e.g., involving the transaction account or other transaction accounts monitored by the fraud analysis platform) are fraudulent, in order to protect funds of a user and/or financial institution, investigate an unauthorized user, and/or prevent future fraudulent transactions (and/or any future transactions) associated with the transaction account or other transaction accounts.

Accordingly, based on whether the fraud analysis platform determines that a transaction interaction signature for a user interaction associated with the transaction matches a reference signature corresponding to the user interaction, the fraud analysis platform may perform one or more actions associated with the transaction and/or the transaction account.

In this way, the fraud analysis platform of example implementation 100 may analyze a user interaction during a transaction to determine whether the transaction is fraudulent based on a probability that the user interaction was performed by an authorized user. If the fraud analysis platform determines that the user is an authorized user (e.g., using timing signatures associated with individual actions of the user interaction, as described herein), the fraud analysis platform may determine that the transaction is not fraudulent. Alternatively, if the fraud analysis platform cannot determine that the user interaction was performed by an authorized user (e.g., if the transaction interaction signature does not match a reference signature of the reference data structure), the fraud analysis platform may determine that the transaction is (or was) likely fraudulent. Further, as described herein, the fraud analysis platform may perform one or more actions based on whether the user is determined to be an authorized user according to timing of the user interaction during the transaction.

Accordingly, the fraud analysis platform, as described herein, may detect, in real-time, whether a transaction is likely fraudulent, and/or may decrease an amount of time to determine that a processed transaction was likely fraudulent, thus decreasing the amount of computing resources and/or network resources needed to detect that the transaction was likely fraudulent. Further, the fraud analysis platform, as described herein, may increase a likelihood of recovering any lost funds from the transaction if the transaction is fraudulent. Therefore, the fraud analysis platform may conserve financial resources of a user (which may improve a customer experience with respect to managing a fraudulent transaction) and/or financial institution.

While certain examples are described herein in connection with a transaction device and the above example user interactions, other types of devices and/or user interactions can be monitored for user authentication. For example, a user interaction (e.g., entering a username/password combination, entering demographic information, performing a particular online activity in a particular manner, and/or the like) with a user device (e.g., a smartphone, a personal computer, a tablet computer, and/or the like) can be monitored to authenticate a user as described herein.

As indicated above, FIGS. 1A-1E are provided as one or more examples. Other examples may differ from what is described with regard to FIGS. 1A-1E.

Figure 2:
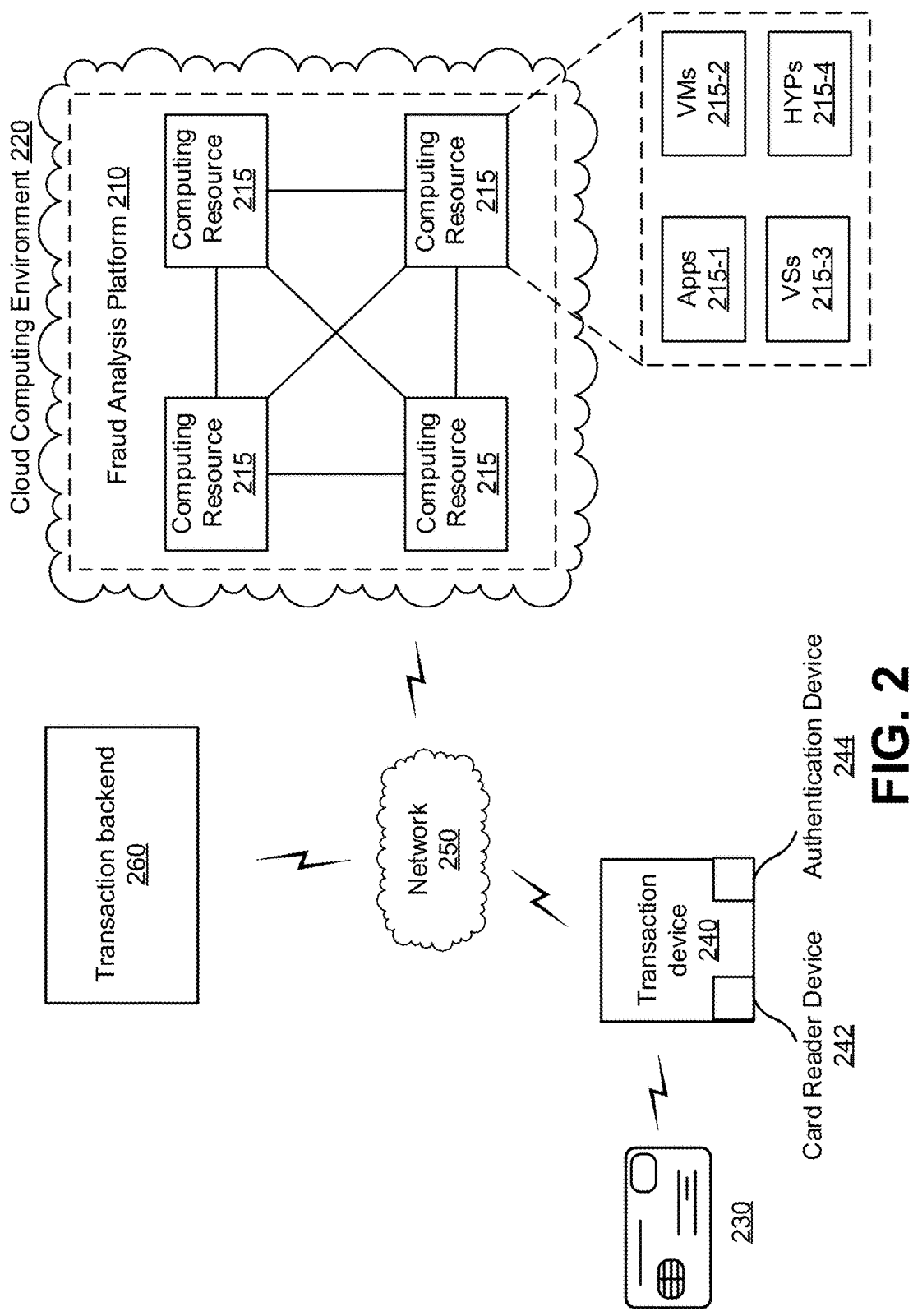
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a fraud analysis platform 210, a computing resource 215, a cloud computing environment 220, a transaction card 230, a transaction device 240, a card reader device 242, an authentication device 244, a transaction backend 250, and a network 260. Devices of environment 200 may interconnect via wired connections, wireless connections, or a combination of wired and wireless connections.

Fraud analysis platform 210 includes one or more computing resources assigned to authenticate a user based on a user interaction associated with a transaction. For example, fraud analysis platform 210 may be a platform implemented by cloud computing environment 220 that may receive timing information associated with a user interaction, generate a transaction interaction signature based on the timing information, and determine whether the user interaction was performed by an authorized user based on whether the transaction interaction signature matches a reference signature of the authorized user. In some implementations, fraud analysis platform 210 is implemented by computing resources 215 of cloud computing environment 220.

Fraud analysis platform 210 may include a server device or a group of server devices. In some implementations, fraud analysis platform 210 may be hosted in cloud computing environment 220. Notably, while implementations described herein may describe fraud analysis platform 210 as being hosted in cloud computing environment 220, in some implementations, fraud analysis platform 210 may be non-cloud-based or may be partially cloud-based.

Cloud computing environment 220 includes an environment that delivers computing as a service, whereby shared resources, services, and/or the like may be provided for transaction device 240 and/or transaction backend 250. Cloud computing environment 220 may provide computation, software, data access, storage, and/or other services that do not require end-user knowledge of a physical location and configuration of a system and/or a device that delivers the services. As shown, cloud computing environment 220 may include fraud analysis platform 210 and computing resource 215.

Computing resource 215 includes one or more personal computers, workstation computers, server devices, or another type of computation and/or communication device. In some implementations, computing resource 215 may host fraud analysis platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by transaction card 230. Application 215-1 may eliminate a need to install and execute the software applications on transaction card 230. For example, application 215-1 may include software associated with fraud analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system. A process virtual machine may execute a single program and may support a single process. In some implementations, virtual machine 215-2 may execute on behalf of a user (e.g., transaction card 230, and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

Transaction card 230 includes a transaction card capable of communicating with transaction device 240. In some implementations, transaction card 230 may be a smart transaction card that is capable of communicating with other devices of environment 200 (e.g., via Bluetooth communication, BLE communication, Wi-Fi communication, a near field communication (NFC) session, and/or the like). Transaction card 230 is capable of communicating data for a transaction with transaction device 240. For example, transaction card 230 may provide, transaction device 240 card information that includes a transaction token, transaction card identification information (e.g., an account identifier, a cardholder identifier, and/or the like), account information, banking information, and/or the like. For example, transaction card 230 may include a magnetic strip and/or an integrated circuit (IC) chip (e.g., a EUROPAY®, MASTERCARD®, VISA® (EMV) chip) that provides the card information to transaction device 240 via an interaction with transaction device 240. Such an interaction may include transaction card 230 being swiped through a magnetic card reader element of transaction device 240, being inserted into transaction device 240 (e.g., into a card reader device of transaction device 240) such that the IC is aligned or in contact with a chip reader of transaction device 240, and/or the like. Transaction card 230 may include a radio frequency (RF) antenna to communicate (e.g., via NFC) card information associated with transaction card 230. The RF antenna may be a passive RF antenna, an active RF antenna, and/or a battery-assisted RF antenna.

Transaction device 240 includes one or more devices capable of receiving, generating, storing, processing, and/or providing transaction information associated with a transaction account, as described herein. For example, transaction device 240 may include an automated teller machine (ATM) device, a point of sale (POS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. A kiosk device may include a computer terminal featuring specialized hardware and software that provides access to information and/or applications for communication, commerce, entertainment, education, and/or the like.

Transaction device 240 may include card reader device 242 to receive card information from transaction card 230. The card information received, by card reader device 242, from transaction card 230 may be received as a card information signal that is generated from a user swiping transaction card 230 in association with a card receiving element of card reader device 242. Card reader device 242 may receive and/or process the card information signal via the card receiving element with a magnetic reader, a card receiving slot with a chip reader element, and/or the like. Accordingly, card reader device 242 may include one or more components and/or circuitry that may obtain a card information signal that includes card information from transaction card 230 when transaction card 230 is provided (e.g., by the user) to card reader device 242 of transaction device 240. Correspondingly, as described herein, user interaction associated with transaction card 230 and/or card reader device 242 may be timestamped (e.g., by transaction device 240) to permit fraud analysis platform 210 to determine and/or analyze characteristics of the user's interaction with transaction device 240 (e.g., the user swiping the transaction card along a card receiving element, the user inserting transaction card 230 into a card receiving slot, and/or the like).

Transaction device 240 may include authentication device 244 to authenticate a user engaging in a transaction. Authentication device 244 may include one or more devices used to authenticate a user. For example, the authentication device may include a keypad of transaction device 240, an electronic signature pad of transaction device 240, a biometric analyzer of transaction device 240 (e.g., a fingerprint scanner, a facial recognition scanner, a retina scanner, and/or the like), and/or the like. As described herein, inputs received by authentication device 244 (e.g., corresponding to a user interaction with authentication device 244) may be timestamped (e.g., by transaction device 240) to permit fraud analysis platform 210 to determine and/or analyze characteristics of a user's interaction with transaction device 240 (e.g., a user entering a PIN via the keypad, a user providing a hand signature via an electronic signature pad, and/or the like).

Transaction backend 250 includes one or more devices capable of authorizing and/or facilitating a transaction. For example, transaction backend 250 may include one or more servers and/or computers to store and/or provide information (e.g., authorizations, balances, transaction tokens, security information, account information, and/or the like) associated with processing a transaction via transaction device 240.

Transaction backend 250 may include one or more devices associated with one or more financial institutions (e.g., banks, credit unions, and/or the like) and/or transaction card associations that authorize the transaction and/or facilitate a transfer of funds or payments between an account of a cardholder of a transaction card (e.g., transaction card 230) and an account of an individual or business of transaction device 240. For example, transaction backend 250 may include one or more devices of one or more issuing financial institutions associated with a cardholder of transaction card 230, one or more devices of one or more acquiring financial institutions (or merchant banks) associated with transaction device 240, and/or one or more devices associated with one or more card associations (e.g., VISA®, MASTERCARD®, and/or the like) associated with transaction card 230. Accordingly, based on receiving transaction card data associated with transaction card 230 from transaction device 240, various financial institutions and/or card associations of transaction backend 250 may communicate to authorize the transaction and/or transfer funds between the accounts associated with transaction card 230 and/or transaction device 240.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
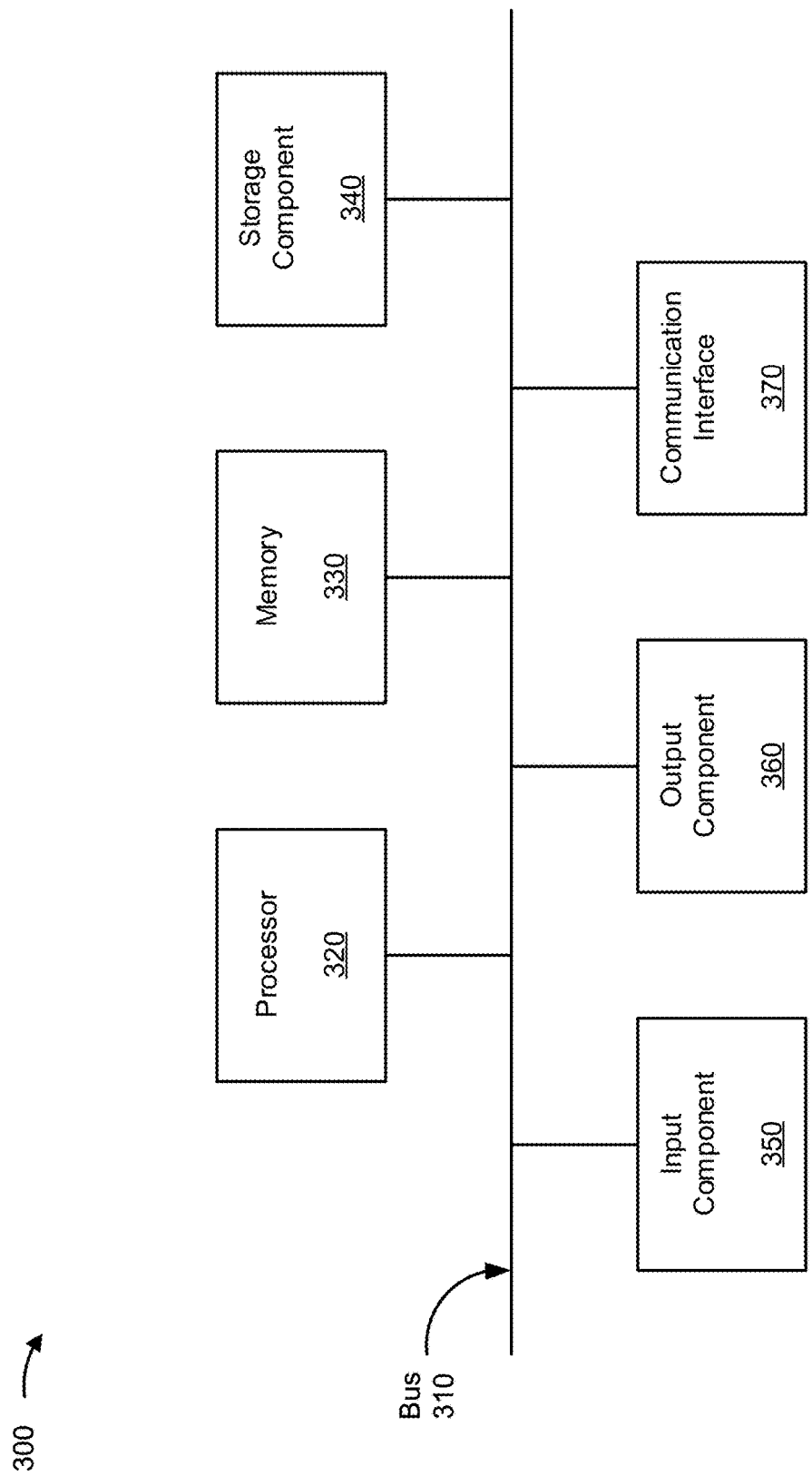
FIG. 3 is a diagram of example components of one or more devices of FIG. 2.

FIG. 3 is a diagram of example components of a device 300. Device 300 may correspond to fraud analysis platform 210, computing resource 215, cloud computing environment 220, transaction card 230, transaction device 240, card reader device 242, authentication device 244, and/or transaction backend 250. In some implementations, fraud analysis platform 210, computing resource 215, cloud computing environment 220, transaction card 230, transaction device 240, card reader device 242, authentication device 244, and/or transaction backend 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
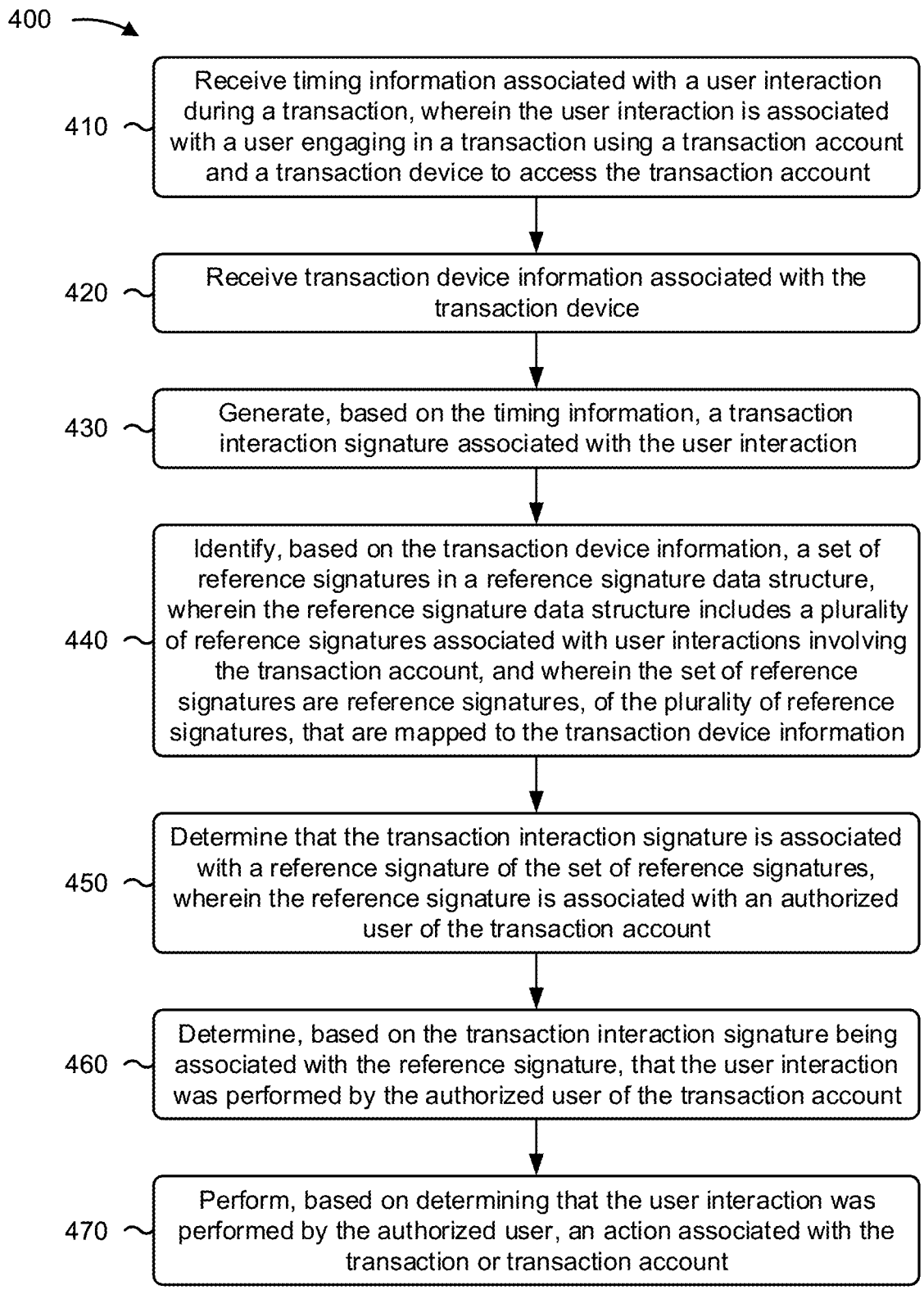
FIG. 4-6 are flowcharts of one or more example processes associated with user authentication based on a user interaction associated with a transaction.

FIG. 4 is a flowchart of an example process 400 associated with user authentication based on a user interaction associated with a transaction. In some implementations, one or more process blocks of FIG. 4 may be performed by a fraud analysis platform (e.g., fraud analysis platform 210). In some implementations, one or more process blocks of FIG. 4 may be performed by another device or a group of devices separate from or including the fraud analysis platform, such as a transaction device (e.g., transaction device 240), a card reader device (e.g., card reader device 242), an authentication device (e.g., authentication device 244), a transaction backend (e.g., transaction backend 250), and/or the like.

As shown in FIG. 4, process 400 may include receiving timing information associated with a user interaction during a transaction, wherein the user interaction is associated with a user engaging in a transaction using a transaction account and a transaction device to access the transaction account (block 410). For example, the fraud analysis platform (e.g., using computing resource 215, processor 320, memory 330, storage component 340, input component 350, output component 360, communication interface 370 and/or the like) may receive timing information associated with a user interaction during a transaction, as described above. In some implementations, the user interaction is associated with a user engaging in a transaction using a transaction account and a transaction device to access the transaction account.

As further shown in FIG. 4, process 400 may include receiving transaction device information associated with the transaction device (block 420). For example, the fraud analysis platform (e.g., using computing resource 215, processor 320, memory 330, storage component 340, input component 350, output component 360, communication interface 370 and/or the like) may receive transaction device information associated with the transaction device, as described above.

As further shown in FIG. 4, process 400 may include generating, based on the timing information, a transaction interaction signature associated with the user interaction (block 430). For example, the fraud analysis platform (e.g., using computing resource 215, processor 320, memory 330, storage component 340, input component 350, output component 360, communication interface 370 and/or the like) may generate, based on the timing information, a transaction interaction signature associated with the user interaction, as described above.

As further shown in FIG. 4, process 400 may include identifying, based on the transaction device information, a set of reference signatures in a reference signature data structure, wherein the reference signature data structure includes a plurality of reference signatures associated with user interactions involving the transaction account, and wherein the set of reference signatures are reference signatures, of the plurality of reference signatures, that are mapped to the transaction device information (block 440). For example, the fraud analysis platform (e.g., using computing resource 215, processor 320, memory 330, storage component 340, input component 350, output component 360, communication interface 370 and/or the like) may identify, based on the transaction device information, a set of reference signatures in a reference signature data structure, as described above. In some implementations, the reference signature data structure includes a plurality of reference signatures associated with user interactions involving the transaction account. In some implementations, the set of reference signatures are reference signatures, of the plurality of reference signatures, that are mapped to the transaction device information.

As further shown in FIG. 4, process 400 may include determining that the transaction interaction signature is associated with a reference signature of the set of reference signatures, wherein the reference signature is associated with an authorized user of the transaction account (block 450). For example, the fraud analysis platform (e.g., using computing resource 215, processor 320, memory 330, storage component 340, input component 350, output component 360, communication interface 370 and/or the like) may determine that the transaction interaction signature is associated with a reference signature of the set of reference signatures, as described above. In some implementations, the reference signature is associated with an authorized user of the transaction account.

As further shown in FIG. 4, process 400 may include determining, based on the transaction interaction signature being associated with the reference signature, that the user interaction was performed by the authorized user of the transaction account (block 460). For example, the fraud analysis platform (e.g., using computing resource 215, processor 320, memory 330, storage component 340, input component 350, output component 360, communication interface 370 and/or the like) may determine, based on the transaction interaction signature being associated with the reference signature, that the user interaction was performed by the authorized user of the transaction account, as described above.

As further shown in FIG. 4, process 400 may include performing, based on determining that the user interaction was performed by the authorized user, an action associated with the transaction or transaction account (block 470). For example, the fraud analysis platform (e.g., using computing resource 215, processor 320, memory 330, storage component 340, input component 350, output component 360, communication interface 370 and/or the like) may perform, based on determining that the user interaction was performed by the authorized user, an action associated with the transaction or transaction account, as described above.

Process 400 may include additional implementations, such as any single implementation or any combination of implementations described below and/or in connection with one or more other processes described elsewhere herein.

In a first implementation, the timing information and the transaction device information are received from the transaction device. In a second implementation, alone or in combination with the first implementation, the user interaction includes a swipe of a transaction card and the timing information includes: a timestamp associated with a beginning of the swipe, and a timestamp associated with an end of the swipe.

In a third implementation, alone or in combination with one or more of the first and second implementations, the user interaction includes providing a user input associated with providing a personal identification number for the transaction account, and the timing information includes timestamps for individual actions involving an input component of the transaction device that is used to provide the personal identification number.

In a fourth implementation, alone or in combination with one or more of the first through third implementations, the user interaction includes providing a user input associated with providing a hand signature to authenticate the user, and the timing information includes timestamps for individual actions involving an electronic signature pad of the transaction device that is used to provide the hand signature.

In a fifth implementation, alone or in combination with one or more of the first through fourth implementations, the authorized user is a first authorized user of a plurality of authorized users associated with the transaction account, and the reference signature is a first reference signature of a plurality of reference signatures that are associated with corresponding ones of the plurality of reference signatures.

In a sixth implementation, alone or in combination with one or more of the first through fifth implementations, the fraud analysis platform, when performing the action, may send, to the transaction device, an authorization to authorize the transaction, bypass performance of an examination of a fraud analysis of the transaction, or flag, in a transaction log maintained for a fraud analysis of the transaction account, the transaction as being performed by the authorized user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
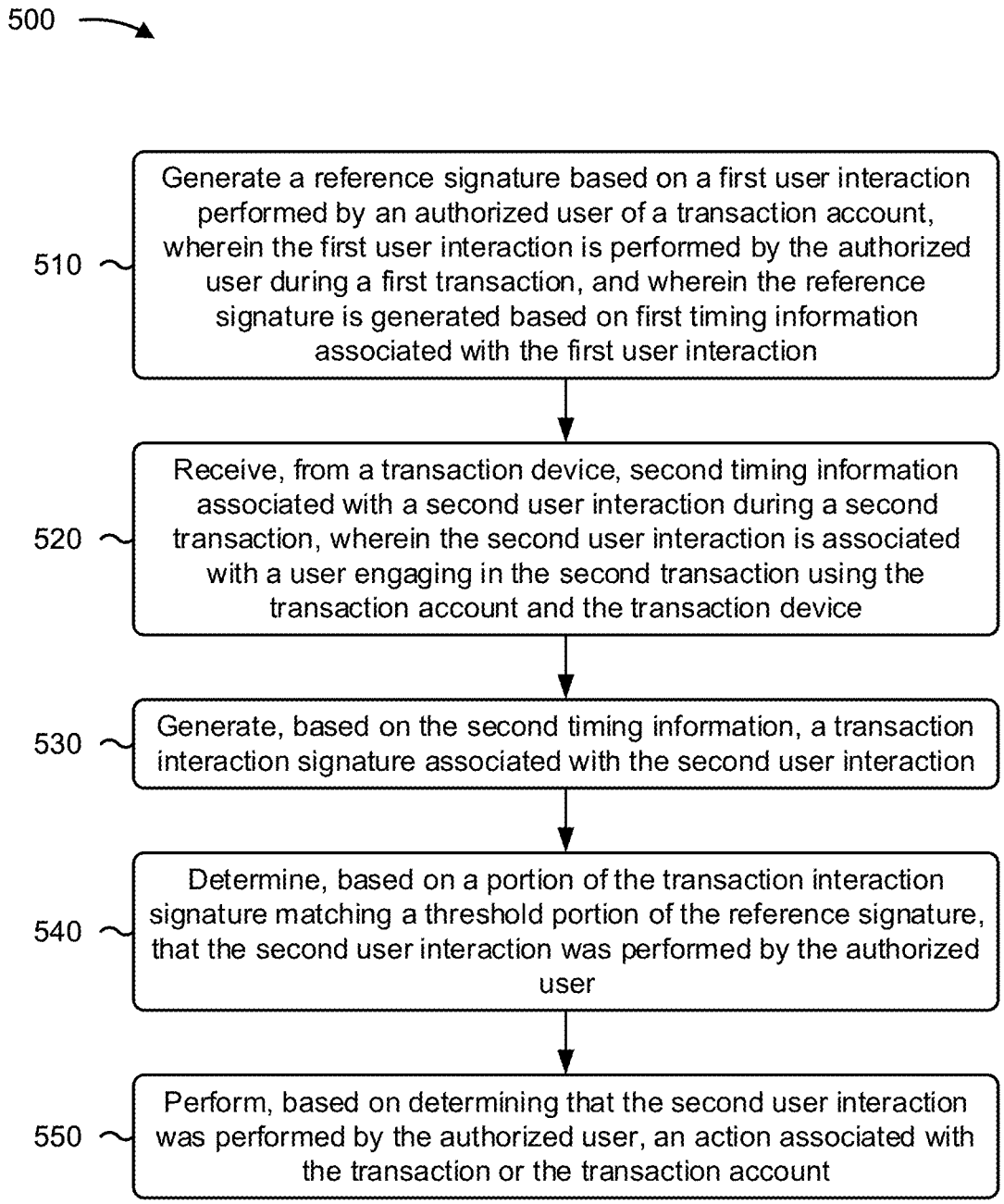

FIG. 5 is a flowchart of an example process 500 associated with user authentication based on a user interaction associated with a transaction. In some implementations, one or more process blocks of FIG. 5 may be performed by a fraud analysis platform (e.g., fraud analysis platform 210). In some implementations, one or more process blocks of FIG. 5 may be performed by another device or a group of devices separate from or including the fraud analysis platform, such as a transaction device (e.g., transaction device 240), a card reader device (e.g., card reader device 242), an authentication device (e.g., authentication device 244), a transaction backend (e.g., transaction backend 250), and/or the like.

As shown in FIG. 5, process 500 may include generating a reference signature based on a first user interaction performed by an authorized user of a transaction account, wherein the first user interaction is performed by the authorized user during a first transaction, and wherein the reference signature is generated based on first timing information associated with the first user interaction (block 510). For example, the fraud analysis platform (e.g., using computing resource 215, processor 320, memory 330, storage component 340, input component 350, output component 360, communication interface 370 and/or the like) may generate a reference signature based on a first user interaction performed by an authorized user of a transaction account, wherein the first user interaction is performed by the authorized user during a first transaction, as described above. In some implementations, the first user interaction is performed by the authorized user during a first transaction. In some implementations, the reference signature is generated based on first timing information associated with the first user interaction.

As further shown in FIG. 5, process 500 may include receiving, from a transaction device, second timing information associated with a second user interaction during a second transaction, wherein the second user interaction is associated with a user engaging in the second transaction using the transaction account and the transaction device (block 520). For example, the fraud analysis platform (e.g., using computing resource 215, processor 320, memory 330, storage component 340, input component 350, output component 360, communication interface 370 and/or the like) may receive, from a transaction device, second timing information associated with a second user interaction during a second transaction, as described above. In some implementations, the second user interaction is associated with a user engaging in the second transaction using the transaction account and the transaction device.

As further shown in FIG. 5, process 500 may include generating, based on the second timing information, a transaction interaction signature associated with the second user interaction (block 530). For example, the fraud analysis platform (e.g., using computing resource 215, processor 320, memory 330, storage component 340, input component 350, output component 360, communication interface 370 and/or the like) may generate, based on the second timing information, a transaction interaction signature associated with the second user interaction, as described above.

As further shown in FIG. 5, process 500 may include determining, based on a portion of the transaction interaction signature matching a threshold portion of the reference signature, that the second user interaction was performed by the authorized user (block 540). For example, the fraud analysis platform (e.g., using computing resource 215, processor 320, memory 330, storage component 340, input component 350, output component 360, communication interface 370 and/or the like) may determine, based on a portion of the transaction interaction signature matching a threshold portion of the reference signature, that the second user interaction was performed by the authorized user, as described above.

As further shown in FIG. 5, process 500 may include performing, based on determining that the second user interaction was performed by the authorized user, an action associated with the transaction or the transaction account (block 550). For example, the fraud analysis platform (e.g., using computing resource 215, processor 320, memory 330, storage component 340, input component 350, output component 360, communication interface 370 and/or the like) may perform, based on determining that the second user interaction was performed by the authorized user, an action associated with the transaction or the transaction account, as described above.

Process 500 may include additional implementations, such as any single implementation or any combination of implementations described below and/or in connection with one or more other processes described elsewhere herein.

In a first implementation, the first user interaction is one of a plurality of reference user interactions and the first transaction is one of a plurality of reference transactions, and the reference signature is generated based on reference timing information associated with the plurality of reference user interactions. In a second implementation, alone or in combination with the first implementation, the reference signature is generated according to timestamps associated with first individual actions performed by the authorized user during the first user interaction, the timestamps of the first individual actions are included in the first timing information, and the transaction interaction signature is generated according to timestamps of the second timing information.

In a third implementation, alone or in combination with one or more of the first and second implementations, the authorized user is determined to be authorized to use the transaction account based on a verification process associated with the first transaction. In a fourth implementation, alone or in combination with one or more of the first through third implementations, the reference signature is associated with at least one of: a type of the first user interaction and the second user interaction, a type of the transaction device, or an entity associated with the transaction.

In a fifth implementation, alone or in combination with one or more of the first through fourth implementations, both the first user interaction and the second user interaction include at least one of: the user swiping a transaction card through a card reader, the user entering a personal identification number via an input component; or the user providing a signature via an electronic signature pad. In a sixth implementation, alone or in combination with one or more of the first through fifth implementations, the fraud analysis platform, when performing the action, is configured to send, to the transaction device, an authorization to authorize the transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
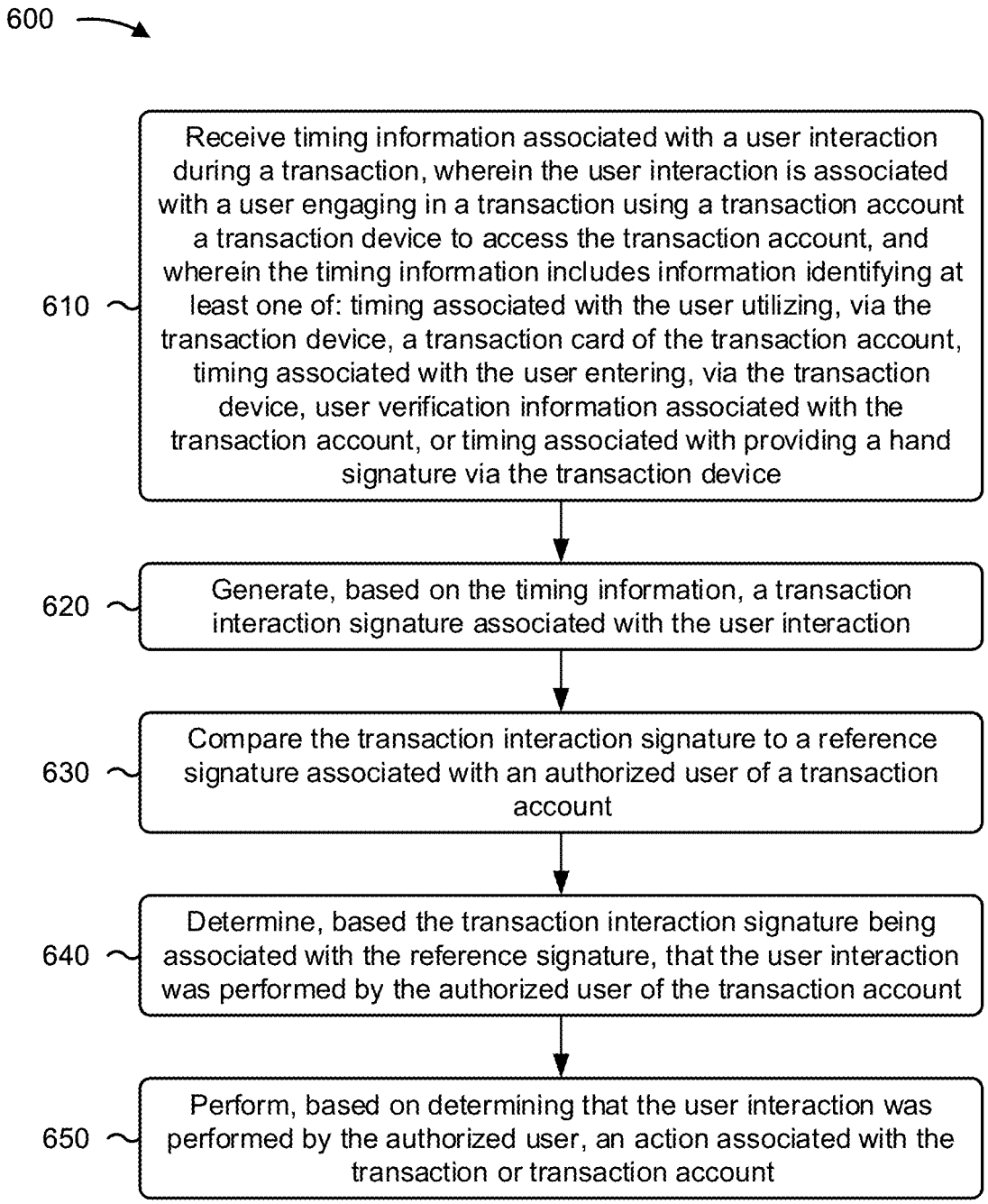

FIG. 6 is a flowchart of an example process 600 user authentication based on a user interaction associated with a transaction. In some implementations, one or more process blocks of FIG. 6 may be performed by a fraud analysis platform (e.g., fraud analysis platform 210). In some implementations, one or more process blocks of FIG. 6 may be performed by another device or a group of devices separate from or including the fraud analysis platform, such as a transaction device (e.g., transaction device 240), a card reader device (e.g., card reader device 242), an authentication device (e.g., authentication device 244), a transaction backend (e.g., transaction backend 250), and/or the like.

As shown in FIG. 6, process 600 may include receiving timing information associated with a user interaction during a transaction, wherein the user interaction is associated with a user engaging in a transaction using a transaction account a transaction device to access the transaction account, and wherein the timing information includes information identifying at least one of: timing associated with the user utilizing, via the transaction device, a transaction card of the transaction account, timing associated with the user entering, via the transaction device, user authentication information associated with the transaction account, or timing associated with providing a hand signature via the transaction device (block 610). For example, the fraud analysis platform (e.g., using computing resource 215, processor 320, memory 330, storage component 340, input component 350, output component 360, communication interface 370 and/or the like) may receive timing information associated with a user interaction during a transaction, as described above. In some implementations, the user interaction is associated with a user engaging in a transaction using a transaction account and a transaction device to access the transaction account. In some implementations, the timing information includes information identifying at least one of timing associated with the user utilizing, via the transaction device, a transaction card of the transaction account, timing associated with the user entering, via the transaction device, user authentication information associated with the transaction account, or timing associated with providing a hand signature via the transaction device.

As further shown in FIG. 6, process 600 may include generating, based on the timing information, a transaction interaction signature associated with the user interaction (block 620). For example, the fraud analysis platform (e.g., using computing resource 215, processor 320, memory 330, storage component 340, input component 350, output component 360, communication interface 370 and/or the like) may generate, based on the timing information, a transaction interaction signature associated with the user interaction, as described above.

As further shown in FIG. 6, process 600 may include comparing the transaction interaction signature to a reference signature associated with an authorized user of a transaction account (block 630). For example, the fraud analysis platform (e.g., using computing resource 215, processor 320, memory 330, storage component 340, input component 350, output component 360, communication interface 370 and/or the like) may compare the transaction interaction signature to a reference signature associated with an authorized user of a transaction account, as described above.

As further shown in FIG. 6, process 600 may include determining, based on the transaction interaction signature being associated with the reference signature, that the user interaction was performed by the authorized user of the transaction account (block 640). For example, the fraud analysis platform (e.g., using computing resource 215, processor 320, memory 330, storage component 340, input component 350, output component 360, communication interface 370 and/or the like) may determine, based on the transaction interaction signature being associated with the reference signature, that the user interaction was performed by the authorized user of the transaction account, as described above.

As further shown in FIG. 6, process 600 may include performing, based on determining that the user interaction was performed by the authorized user, an action associated with the transaction or transaction account (block 650). For example, the fraud analysis platform (e.g., using computing resource 215, processor 320, memory 330, storage component 340, input component 350, output component 360, communication interface 370 and/or the like) may perform, based on determining that the user interaction was performed by the authorized user, an action associated with the transaction or transaction account, as described above.

Process 600 may include additional implementations, such as any single implementation or any combination of implementations described below and/or in connection with one or more other processes described elsewhere herein.

In a first implementation, the transaction interaction signature is generated based on a timestamp associated with a beginning of the user interaction and a timestamp associated with an end of the user interaction, the transaction interaction signature corresponds to a duration of the user interaction and the reference signature corresponds to a reference duration corresponding to an average duration of previous user interactions performed by the user during previous transactions, and the transaction interaction signature is determined to be associated with the reference signature based on the duration of the user interaction being within a threshold range of the average duration.

In a second implementation, alone or in combination with the first implementation, at least one of: the timestamp of the beginning of the user interaction corresponds to a time at which a first bit of the transaction card is read by the transaction device and the timestamp of the end of the user interaction corresponds to a time at which a last bit of the transaction card is read by the transaction device; the timestamp of the beginning of the user interaction corresponds to a time at which a first user input, associated with the user authentication information, is provided to the transaction device, and the timestamp of the end of the user interaction corresponds to a time at which a last user input, associated with the user authentication information, is provided to the transaction device; or the timestamp of the beginning of the user interaction corresponds to a time at which is the hand signature is started using an electronic signature pad of the transaction device, and the timestamp of the end of the user interaction corresponds to a time at which the hand signature is completed via the electronic signature pad of the transaction device.

In a third implementation, alone or in combination with one or more of the first and second implementations, the timing information includes timestamps of individual actions of the user during the transaction, and the reference signature is generated based on timestamps of individual actions of the authorized user during a previous transaction involving the transaction account.

In a fourth implementation, alone or in combination with one or more of the first through third implementations, the reference signature is compared with the transaction interaction signature based on at least one of: a type of the transaction device, or an entity associated with the transaction.

In a fifth implementation, alone or in combination with one or more of the first through fourth implementations, the fraud analysis platform may send, to the transaction device, an authorization to authorize the transaction, bypass performance of an examination of a fraud analysis of the transaction, or flag, in a transaction log maintained for a fraud analysis of the transaction account, the transaction as being performed by the authorized user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, timing information associated with a user interaction during a transaction,
   wherein the user interaction is associated with a user engaging in the transaction using a transaction account and a transaction device to access the transaction account,
   wherein the user interaction includes the user applying a stylus to an electronic signature pad to provide a hand signature,
   wherein the timing information includes one or more timestamps associated with a plurality of phases associated with the user interaction, and
   wherein each phase, of the plurality of phases, is associated with the user inputting authentication information associated with the transaction account;
   receiving, by the device, transaction device information associated with the transaction device;
   generating, by the device and based on the timing information, a transaction interaction signature associated with the user interaction, wherein generating the transaction interaction signature comprises:
translating the one or more timestamps to data points,
determining values of the data points based on a type of phase, associated with the plurality of phases and associated with a timestamp, of the one or more timestamps, and
combining the data points to form the transaction interaction signature,
wherein the transaction interaction signature comprises a plurality of pulses separated by durations based on the one or more timestamps, wherein a pulse, of the plurality of pulses, corresponds to an amount of time between the user removing the stylus from the electronic signature pad and the user performing a next action to reapply the stylus to the electronic signature pad or submit the hand signature;
wherein each pulse, of the plurality of pulses, corresponds to a particular phase, of the plurality of phases, and
wherein a length of the transaction interaction signature corresponds to a duration of the user interaction;
identifying, by the device and based on the transaction device information, a set of reference signatures in a reference signature data structure,
wherein the reference signature data structure includes a plurality of reference signatures associated with other user interactions involving the transaction account,
wherein the set of reference signatures are reference signatures, of the plurality of reference signatures, that are mapped to the transaction device information;
determining, by the device, that the transaction interaction signature is associated with a reference signature of the set of reference signatures,
wherein the reference signature is associated with an authorized user of the transaction account;
training, by the device, a machine learning model based on historical data associated with determining an accuracy of whether the user is the authorized user;
determining, by the device and based on the transaction interaction signature being associated with the reference signature and using the machine learning model, that the user interaction was performed by the authorized user of the transaction account based on determining whether a threshold percentage of the transaction interaction signature matches the reference signature;
retraining, by the device, the machine learning model with the transaction interaction signature based on determining that the user interaction was performed by the authorized user and based on the transaction interaction signature, and
performing, by the device and based on determining that the user interaction was performed by the authorized user, an action associated with the transaction or transaction account,
wherein the action includes sending an authentication token allowing the transaction device to process the transaction.

2. The method of claim 1, wherein the timing information and the transaction device information are received from the transaction device.

3. The method of claim 1, wherein the user interaction includes a swipe of a transaction card and the timing information includes:
a timestamp associated with a beginning of the swipe, and
a timestamp associated with an end of the swipe.

4. The method of claim 1, wherein the user interaction includes providing a user input associated with providing a personal identification number for the transaction account and the timing information includes:
timestamps for individual actions involving an input component of the transaction device that is used to provide the personal identification number.

5. The method of claim 1, wherein the user interaction includes providing a user input associated with providing the hand signature to authenticate the user and the timing information includes:
timestamps for individual actions involving the electronic signature pad of the transaction device that is used to provide the hand signature.

6. The method of claim 1, wherein the authorized user is a first authorized user of a plurality of authorized users associated with the transaction account, and
wherein the reference signature is a first reference signature of a plurality of reference signatures that are associated with corresponding ones of the plurality of reference signatures.

7. The method of claim 1, wherein performing the action comprises at least one of:
sending, to the transaction device, an authorization to authorize the transaction,
bypassing performance of an examination of a fraud analysis of the transaction, or
flagging, in a transaction log maintained for a fraud analysis of the transaction account, the transaction as being performed by the authorized user.

8. A device, comprising:
one or more memories; and
one or more processors communicatively coupled to the one or more memories, configured to:
generate a reference signature based on a first user interaction performed by an authorized user of a transaction account,
wherein the first user interaction is performed by the authorized user during a first transaction, and
wherein the reference signature is generated based on first timing information associated with the first user interaction;
receive, from a transaction device, second timing information associated with a second user interaction during a second transaction,
wherein the second user interaction is associated with a user engaging in the second transaction using the transaction account and the transaction device,
wherein the second timing information includes one or more timestamps associated with a plurality of phases associated with the second user interaction, and
wherein each phase, of the plurality of phases, is associated with the user inputting authentication information associated with the transaction account;
generate, based on the second timing information, a transaction interaction signature associated with the second user interaction,
wherein the one or more processors, when generating the transaction interaction signature, are to:

translate the one or more timestamps to data points,
determine values of the data points based on a type of phase associated with a timestamp, of the one or more timestamps, and
combine the data points to form the transaction interaction signature,
wherein the transaction interaction signature comprises a plurality of pulses separated by durations based on the one or more timestamps,
wherein each pulse, of the plurality of pulses, corresponds to a particular phase, of the plurality of phases, and
wherein a length of the transaction interaction signature corresponds to a duration of the user interaction;
train a machine learning model based on historical data associated with determining an accuracy of whether the user is the authorized user;
determine, based on a portion of the transaction interaction signature matching a threshold portion of the reference signature and using the machine learning model, that the second user interaction was performed by the authorized user;
retrain the machine learning model with the transaction interaction signature based on determining that the user interaction was performed by the authorized user and based on the transaction interaction signature; and
perform, based on determining that the second user interaction was performed by the authorized user, an action associated with the transaction or the transaction account,
wherein the action includes sending an authentication token allowing the transaction device to process the transaction.

9. The device of claim 8, wherein the first user interaction is one of a plurality of reference user interactions and the first transaction is one of a plurality of reference transactions,
wherein the reference signature is generated based on reference timing information associated with the plurality of reference user interactions.

10. The device of claim 8, wherein the reference signature is generated according to timestamps associated with first individual actions performed by the authorized user during the first user interaction,
wherein the timestamps of the first individual actions are included in the first timing information, and
wherein the transaction interaction signature is generated according to timestamps of the second timing information.

11. The device of claim 8, wherein the authorized user is determined to be authorized to use the transaction account based on a verification process associated with the first transaction.

12. The device of claim 8, wherein the reference signature is associated with at least one of:
a type of the first user interaction and the second user interaction,
a type of the transaction device, or
an entity associated with the transaction.

13. The device of claim 8, wherein both the first user interaction and the second user interaction include at least one of:
the user swiping a transaction card through a card reader, wherein the transaction card is associated with the transaction account;
the user entering a personal identification number via an input component; or
the user providing a signature via an electronic signature pad.

14. The device of claim 8, wherein the one or more processors, when performing the action, are configured to:
send, to the transaction device, an authorization to authorize the transaction.

15. A non-transitory computer-readable medium storing instructions, the instructions comprising:
one or more instructions that, when executed by one or more processors, cause the one or more processors to:
receive timing information associated with a user interaction during a transaction,
wherein the user interaction is associated with a user engaging in the transaction using a transaction account and a transaction device to access the transaction account,
wherein the timing information includes information identifying at least one of:
timing associated with the user utilizing, via the transaction device, a transaction card of the transaction account,
timing associated with the user entering, via the transaction device, user authentication information associated with the transaction account, or
timing associated with providing a hand signature via the transaction device, and
wherein the timing information includes one or more timestamps associated with a plurality of phases associated with the user interaction,
wherein each phase, of the plurality of phases, is associated with the user inputting authentication information associated with the transaction account;
generate, based on the timing information, a transaction interaction signature associated with the user interaction,
wherein the one or more instructions, that cause the one or more processors to generate the transaction interaction signature, cause the one or more processors to:
translate the one or more timestamps to data points,
determine values of the data points based on a type of phase associated with a timestamp, of the one or more timestamps, and
combine the data points to form the transaction interaction signature,
wherein the transaction interaction signature comprises a plurality of pulses separated by durations based on the one or more timestamps,
wherein each pulse, of the plurality of pulses, corresponds to a particular phase, of the plurality of phases, and
wherein a length of the transaction interaction signature corresponds to a duration of the user interaction;
compare the transaction interaction signature to a reference signature associated with an authorized user of a transaction account;
train a machine learning model based on historical data associated with determining an accuracy of whether the user is the authorized user;

determine, based on whether a threshold portion of the transaction interaction signature matches the reference signature and using the machine learning model, that the user interaction was performed by the authorized user of the transaction account;

retrain the machine learning model with the transaction interaction signature based on determining that the user interaction was performed by the authorized user and based on the transaction interaction signature; and perform, based on determining that the user interaction was performed by the authorized user, an action associated with the transaction or transaction account,
  wherein the action includes sending an authentication token allowing the transaction device to process the transaction.

16. The non-transitory computer-readable medium of claim 15, wherein the transaction interaction signature is generated based on a timestamp associated with a beginning of the user interaction and a timestamp associated with an end of the user interaction,
  wherein the transaction interaction signature corresponds to a duration of the user interaction and the reference signature corresponds to a reference duration corresponding to an average duration of previous user interactions performed by the user during previous transactions,
  wherein the transaction interaction signature is determined to be associated with the reference signature based on the duration of the user interaction being within a threshold range of the average duration.

17. The non-transitory computer-readable medium of claim 16, wherein at least one of:
  the timestamp of the beginning of the user interaction corresponds to a time at which a first bit of the transaction card is read by the transaction device and the timestamp of the end of the user interaction corresponds to a time at which a last bit of the transaction card is read by the transaction device, the timestamp of the beginning of the user interaction corresponds to a time at which a first user input, associated with the user authentication information, is provided to the transaction device, and the timestamp of the end of the user interaction corresponds to a time at which a last user input, associated with the user authentication information, is provided to the transaction device, or the timestamp of the beginning of the user interaction corresponds to a time at which the hand signature is started using an electronic signature pad of the transaction device, and the timestamp of the end of the user interaction corresponds to a time at which the hand signature is completed via the electronic signature pad of the transaction device.

18. The non-transitory computer-readable medium of claim 15, wherein the timing information includes timestamps of individual actions of the user during the transaction, and
  wherein the reference signature is generated based on timestamps of individual actions of the authorized user during a previous transaction involving the transaction account.

19. The non-transitory computer-readable medium of claim 15, wherein the reference signature is compared with the transaction interaction signature based on at least one of:
  a type of the transaction device, or
  an entity associated with the transaction.

20. The non-transitory computer-readable medium of claim 15, wherein the one or more instructions, that cause the one or more processors to perform the action, cause the one or more processors to at least one of:
  send, to the transaction device, an authorization to authorize the transaction,
  bypass performance of an examination of a fraud analysis of the transaction, or
  flag, in a transaction log maintained for a fraud analysis of the transaction account, the transaction as being performed by the authorized user.

* * * * *